United States Patent [19]

Nelson

[11] 3,838,260

[45] Sept. 24, 1974

[54] MICROPROGRAMMABLE CONTROL MEMORY DIAGNOSTIC SYSTEM

[75] Inventor: Frank M. Nelson, Sherman Oaks, Calif.

[73] Assignee: Xerox Corporation, Stamford, Conn.

[22] Filed: Jan. 22, 1973

[21] Appl. No.: 325,479

[52] U.S. Cl. .......... 235/153 AK

[51] Int. Cl. .......... G06f 11/04

[58] Field of Search .......... 235/153 AK; 340/172.5

[56] References Cited

UNITED STATES PATENTS

| | | | |
|---|---|---|---|
| 3,259,881 | 7/1966 | Doyle et al. | 235/153 AK |
| 3,286,239 | 11/1966 | Thompson et al. | 235/153 AK |
| 3,343,141 | 9/1967 | Hackl | 340/172.5 |
| 3,519,808 | 7/1970 | Lawder | 235/153 AK |
| 3,575,589 | 4/1971 | Neema et al. | 235/153 AK |
| 3,688,263 | 8/1972 | Balogh et al. | 340/172.5 |

*Primary Examiner*—Charles E. Atkinson

[57] ABSTRACT

Periodically operating test microprograms and fault detection circuits for a data processing system containing a microprogrammable control memory are disclosed. Said fault detection is performed concurrently with normal data processing in a time-shared fashion. Also disclosed are means for storing fault information and the status of said system at the time of fault detection, and a terminal coupled to the system by communication lines for enabling the execution of software diagnostics and the read out of all stored fault information.

10 Claims, 21 Drawing Figures

PATENTED SEP 24 1974 3,838,260

SHEET 03 OF 17

DIAGNOSTIC SELF TEST PROGRAM

| BITS 0 1 2 3 4 5 | |
|---|---|
| 0 0 0 0 0 0 | NO FAULTS |
| 1 - - - - - | CPU FAULT |
| - 1 - - - - | RESERVED FOR SYSTEMS |
| - - 1 - - - | IOP 2 |
| - - - 1 - - | IOP 1 |
| - - - - 1 - | INTERRUPT MASTER |
| - - - - - 1 | DIRECT MEMORY ADAPTERS |

CONTROL MEMORY SYMBOLIC LISTING

| SYMBOLIC LABEL | ROS ADRS | RC | SC | DC | IT | IF | IO | MI | DI | ST | *TAG | FD | FC | FB | FA |
|---|---|---|---|---|---|---|---|---|---|---|---|---|---|---|---|
| ST00X02 | 009A | RWRXD | SINV | DXS | | | | | | STXSTR | *AL-ST00X03 | | | | |
| ST00X03 | 009B | RWX1 | | | | | | | | | *AL-ST02X04 | | NR00 | | |
| ST00X04 | 00AC | RWRXD | | DXS | | | | | | | *AL-ST00X05 | | | | |
| ST00X05 | 009D | RWRXD | SINV | DXS | | | | | | STXSTR | *AL-ST00X06 | | | | |
| ST00X06 | 009E | RWX1 | | | | | | | | | *AL-ST02X07 | | NEBR | | |
| ST00X07 | 00A4 | RWRXD | | DXS | | | | | | | *AL-ST00X08 | | | | |
| ST00X08 | 009F | RWRXD | SINV | DXS | | | | | | STXSTR | *AL-ST00X09 | | | | |
| ST00X09 | 00A1 | RW4XD | | DXS | | | | | | | *AL-ST00X10 | | | | |
| ST00X10 | 00A2 | RW4XD | SINV | DXS | | | | | | | *AL-ST00X11 | | | | |
| ST00X11 | 00A3 | RW4XD | | DXS | FNCTXR | | | | | | *AL-ST00X12 | | | | |
| ST00X12 | 00A5 | RW4XD | SINV | DXS | | | | | | STXSTR | *AL-ST00X13 | | | | |
| ST00X13 | 00A6 | RW4XD | SINV | DXS | FNCTXR | | | | | | *AL-ST00X14 | | | | |
| ST00X14 | 00A7 | RW4XD | SINV | DXS | | | | | | STXSTR | *AL-ST00X15 | | | | |
| ST00X15 | 00A9 | RWRA4 | SPO | | | | | | | | *AL-ST02X16 | | | | NRODD |
| ST00X16 | 0027 | RWRA4 | SPO | | FNCTXR | | | | | | *AL-ST00X17 | | | | |
| ST00X17 | 00AA | RWRA4 | SMO | | | | | | | | *AL-ST02X18 | | | | NRODD |
| ST00X18 | 0063 | RWRA4 | | | | | | | | | *AL-ST00X19 | | FNCT1 | | |
| ST00X19 | 00B0 | RW4XD | SINV | DXS | FNCTXR | | | | | | *AL-ST00X20 | | | | NRODD |
| ST00X20 | 0072 | RW4XD | SINV | DXS | | | | | | STXSTR | *AL-ST02X21 | | FNCT1 | | |
| ST00X21 | 00BC | RXD | STO | | FNCTXR | | | | | | *AL-ST00X22 | | | | NRODD |
| ST00X22 | 008E | | | | | | | | | | *AL-ST02X23 | | FNCT1 | | |
| ST00X23 | 00C4 | | | | FSTXSC | | | | | | *AL-IDLE | | | | |
| ST02X04 | 00A8 | RXD | STO | | | | | | | | *AL-STEND | | | | |
| ST02X07 | 00A0 | RXD | STO | | | | | | | | *AL-STEND | | | | |
| ST02X16 | 0026 | RXD | STO | | | | | | | | *AL-STEND | | | | |
| ST02X18 | 0062 | RXD | STO | | | | | | | | *AL-STEND | | | | |
| ST02X19 | 00B4 | RXD | STO | | | | | | | | *AL-STEND | | | | |
| ST02X20 | 0073 | RW4XD | SINV | DXS | | | | | | | *AL-ST02X21 | | | | |
| ST02X21 | 00B8 | RXD | STO | | | | | | | | *AL-STEND | | | | |
| ST02X22 | 008F | | STO | | | | | | | | *AL-STEND | | | | |
| ST02X23 | 00C0 | | STO | | | | | | | | *AL-STEND | | | | |
| STEND | 00AB | | | | FSTXSC | | | | | STXSTR | *AL-IDLE | | | | |

FIG. 10

FIG. 11A

| FIELD | BIT | MNEMONIC |
|---|---|---|
| RC | 0000 | NOOP |
| RC | 0001 | RWX1 |
| RC | 0010 | RAX1N |
| RC | 0011 | RWX1N |
| RC | 0100 | RA4X1 |
| RC | 0101 | RWRA4 |
| RC | 1000 | RXD |
| RC | 1001 | RWRXD |
| RC | 1101 | RW4XD |
| SC | 0000 | NOOP |
| SC | 0001 | SF1 |
| SC | 0010 | STO |
| SC | 0011 | IHTO |
| SC | 0100 | SPO |
| SC | 0110 | HTO |
| SC | 1000 | SMO |
| SC | 1010 | CTO |
| SC | 1100 | SOOXO |
| SC | 1101 | SINV |
| SC | 1110 | HCETO |
| DC | 10000 | NOOP |
| DC | 00000 | DXS |
| DC | 00001 | DOXS |
| DC | 00010 | D1XS |
| DC | 10001 | D1INH |
| DC | 10010 | DOINH |
| DC | 10100 | DXIO |
| DC | 10101 | DOXIO |
| DC | 10110 | D1XIO |
| DC | 11000 | DXDIO |
| DC | 11001 | DOXDI |
| DC | 11010 | D1XDI |
| IT | 000 | NOOP |
| IT | 001 | FNCTXS |
| IT | 010 | FNCTXR |
| IT | 100 | FSTXSC |
| IF | 00 | NOOP |
| IF | 01 | FSTX1 |
| IF | 10 | FNCT1X1 |

| FIELD | BIT | MNEMONIC |
|---|---|---|
| IO | 00000 | NOOP |
| IO | 00001 | RELX1 |
| IO | 00010 | HOLD |
| IO | 00011 | RELH |
| IO | 00100 | DSOX1 |
| IO | 00101 | DSOREL |
| IO | 00110 | DSOH |
| IO | 01000 | ISXDO |
| IO | 10011 | DSODO |
| IO | 01110 | DSOHDO |
| IO | 10000 | TMX1 |
| MI | 0000 | NOOP |
| MI | 0001 | MRD |
| MI | 0010 | MW1X1 |
| MI | 0011 | MWB1 |
| MI | 0100 | MWOX1 |
| MI | 0101 | MWBO |
| MI | 0111 | MW |
| MI | 1000 | LXS |
| MI | 1001 | MLRD |
| MI | 1011 | MLWB1 |
| MI | 1101 | MLWBO |
| MI | 1111 | MLW |
| DI | 00000 | NOOP |
| DI | 00001 | DFSAX1 |
| DI | 00010 | CC4X1 |
| DI | 00011 | DIXO4 |
| DI | 00100 | CC3X1 |
| DI | 00101 | DIX30 |
| DI | 01000 | DIOXD1 |
| DI | 10000 | DIOXDO |
| DI | 10001 | DIXOODO |
| DI | 10011 | DIXO4DO |
| DI | 10101 | DIX3ODO |
| DI | 10111 | DIX34DO |
| DI | 11001 | DIXOOD |
| DI | 11011 | DIXO4D |
| DI | 11101 | DIX3OD |
| DI | 11111 | DIX34D |

FIG. 11B

| FIELD | BIT | MNEMONIC |
|---|---|---|
| ST | 000 | NOOP |
| ST | 001 | IDLE |
| ST | 010 | STXSTR |
| ST | 100 | OPEN |
| FC | 000 | ZERO |
| FC | 001 | ONE |
| FC | 010 | NEBR |
| FC | 011 | SAMPEN |
| FC | 100 | FNCT1 |
| FC | 101 | NROO |
| FC | 110 | FST |
| FC | 111 | NDECO |

| FIELD | BIT | MNEMONIC |
|---|---|---|
| FB | 000 | ZERO |
| FB | 001 | ONE |
| FB | 010 | FNCT2 |
| FB | 011 | NDEC1 |
| FB | 100 | SRV1 |
| FB | 101 | DX2 |
| FB | 110 | DIOMODE |
| FB | 111 | FBNI |
| FA | 000 | ZERO |
| FA | 001 | ONE |
| FA | 010 | SELFT |
| FA | 011 | NDC |
| FA | 100 | NRODD |
| FA | 101 | SRVO |
| FA | 110 | DA15 |
| FA | 111 | NDEC2 |

MICROPROGRAMMABLE CONTROL MEMORY DIAGNOSTIC SYSTEM

BACKGROUND OF THE INVENTION

The present invention relates to continuously operating fault detection circuits for use in a data processing system, and more particularly to fault isolation circuits used with a microprogrammed control memory. This fault detection capability is used in conjunction with fault recording hardware and a remote terminal to allow for data processing system trouble-shooting by remote maintenance personnel.

Data processing systems usually include a library of diagnostic programs. These programs are exercised either when there is an indication of a malfunction or at some periodic interval determined by a maintenance program. In either case, if the malfunction is found it will be unclear, because of a lack of historical data, as to how long the malfunction existed and what the environment was at the point in time when the malfunction first became apparent. The improvement described herein consists of continuously operating test microprograms and fault detection circuits. When faults are detected the software records all pertinent information existing at that moment and then goes on with its normal data processing. Thus a continuous history of all malfunctions can be kept in memory for future analysis. In fact, a statistical analysis of accumulated error data may be used to predict malfunctions before they occur, or aid in computer redesign.

A related problem involves a computer located remotely from the servicing personnel. In the case of system failure the service organization, through a lack of information, may dispatch the wrong person or may dispatch a person with the wrong tools or parts. An improvement would be the provision of a remotely located terminal so that the service organization could do a preliminary amount of trouble-shooting at the remote site, either by reading out the error data collected by the above error logging procedures, or by calling in from the diagnostic library those programs that are applicable to the malfunction being investigated. Thus, the service organization would have more information at its disposal before dispatching personnel and parts.

SUMMARY OF INVENTION

An object of the present invention is to provide the capability of continuous fault reporting and error logging of a data processing system. This is accomplished in two ways. First, the control memory of a microprogrammed device can contain within it a test microprogram scheduled to be executed periodically. A timer generates an interrupt of appropriate priority such that the circuits will be exercised and faults reported to a fault register. Another source of malfunction information are those error detecting circuits and software implementations that normally exist in data processing systems. Examples are parity checks and check sums of data streams. Malfunctions reported through these devices will also be reported to the fault register. When a fault is reported to the fault register the computer is immediately forced into a wait state to preserve all environmental information. At this point the program is interrupted into a software subroutine that interrogates the fault register, determines the type of malfunction existing, and logs all appropriate data related to the condition of the data processing system at the time of the malfunction. Thus, a history of system performance can be generated in real time.

Another object of this invention is to provide facilities such that trouble-shooting can be accomplished by maintenance personnel at a remote location. For purposes of description let it be assumed that there are several data processing systems in an area serviced by one maintenance organization. In case of a malfunction at any site, if the service personnel could do a significant amount of trouble-shooting of the data processing system while still at the central maintenance site, a significant decrease in maintenance costs could be achieved. In the described embodiment the data processing system is connected through a terminal control interface and data set, and through telephone lines, or an equivalent, to a remote terminal located in the maintenance facility. Thus, maintenance personnel will be able to exercise the data processing system with off-line and on-line diagnostics and also read out all information contained in the error logs.

The foregoing and other objects, features and advantages of the invention will be better understood from the following description taken in connection with the accompanying drawings.

Figure 3A:
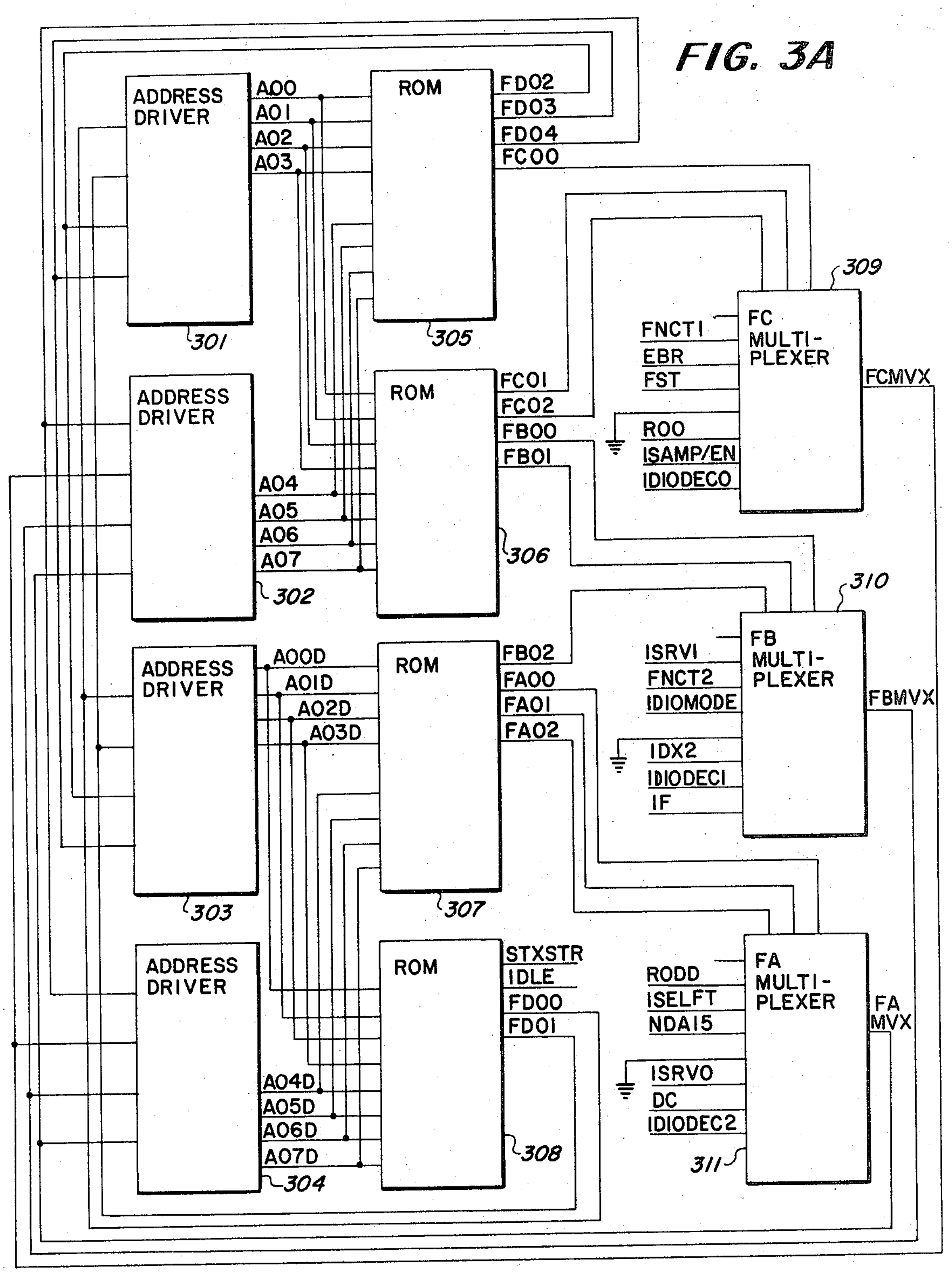
Figure 3B:
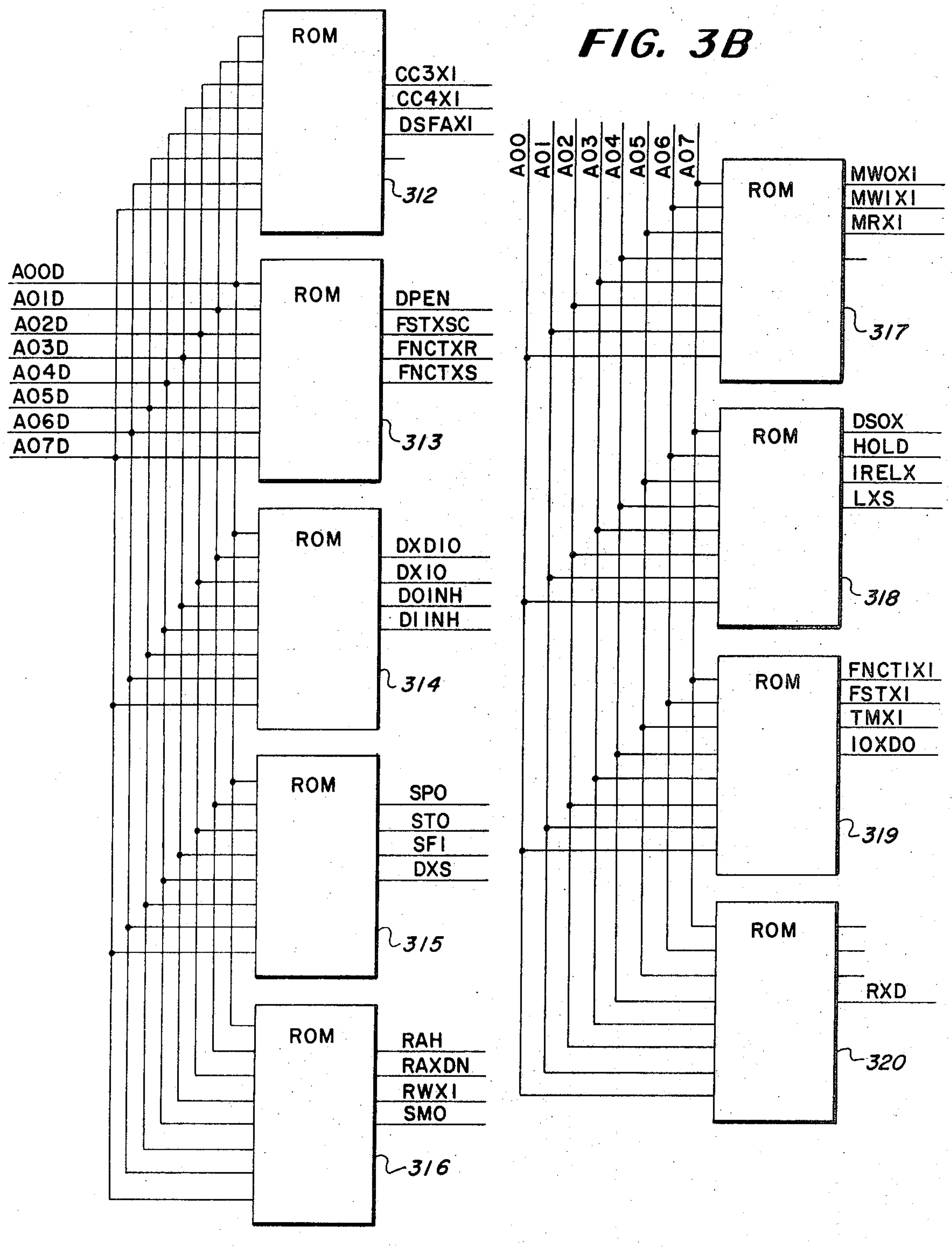
Figure 4A:
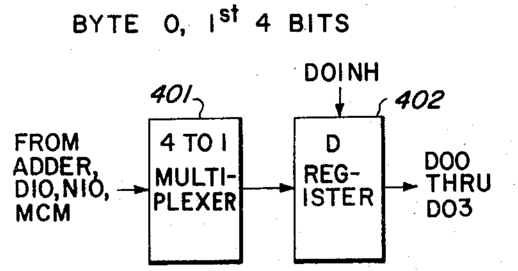
Figure 4B:
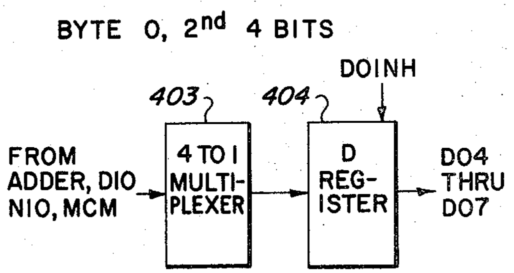
Figures 4C, 4D:
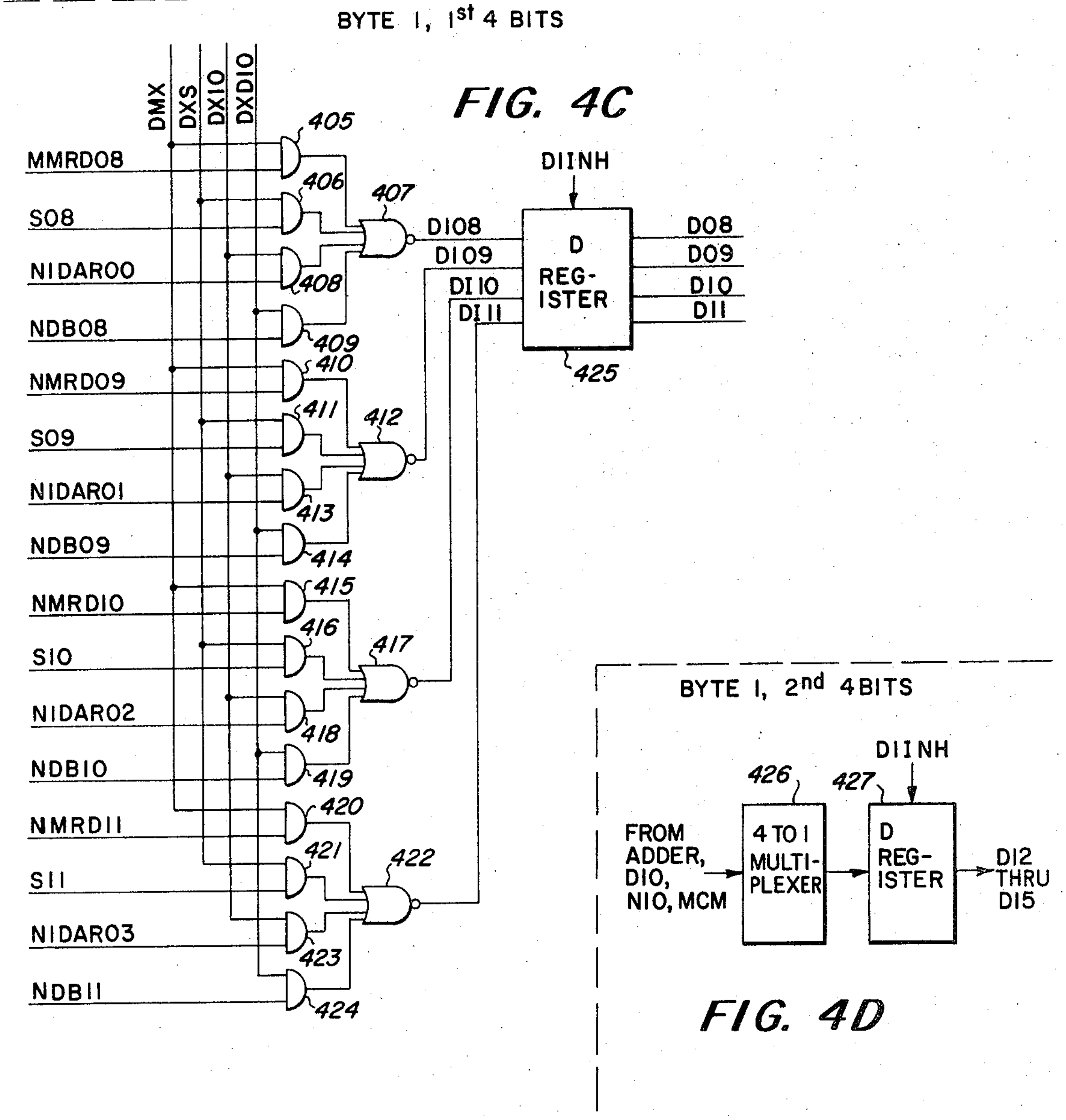

FIGS. 3A and 3B constitute a simplified wiring diagram of the control memory implementation.

FIGS. 4A, 4B, 4C and 4D are a simplified wiring diagram of the 4 to 1 Multiplexer and D Register.

Figure 5A:
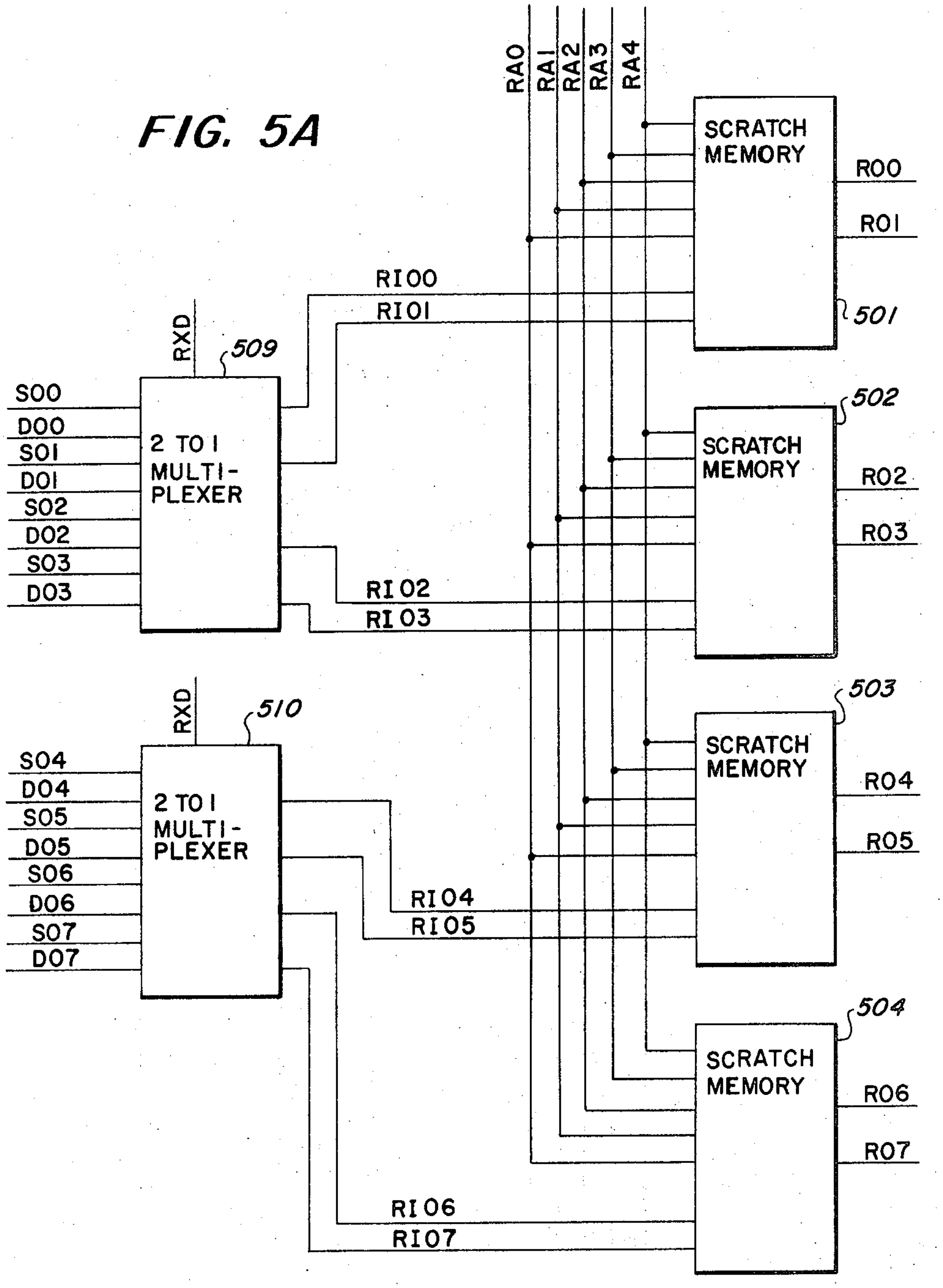
Figure 5B:
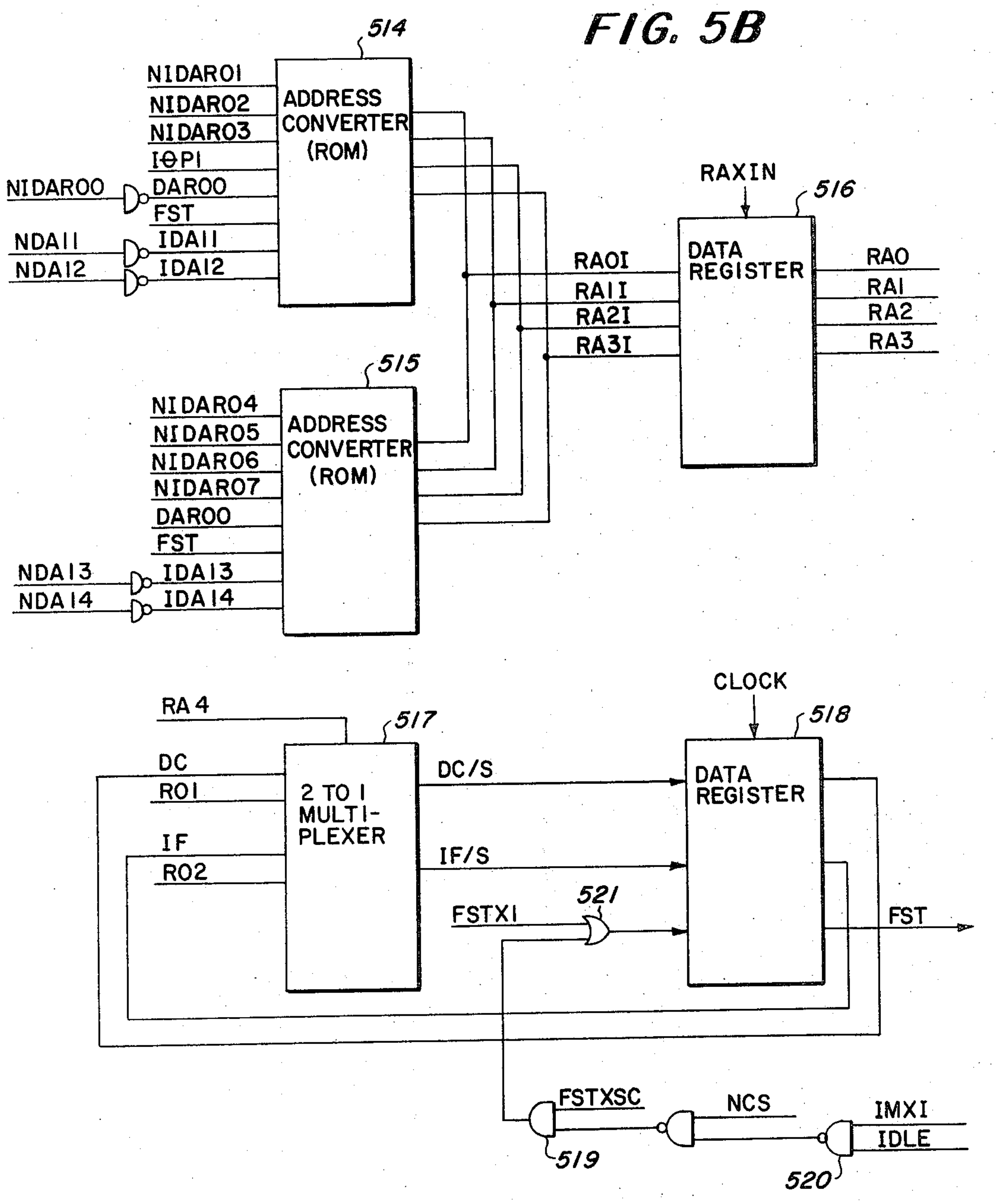

FIG. 5A and 5B are simplified wiring diagrams of the 2 to 1 Multiplexer and Scratch Memory.

Figure 6:
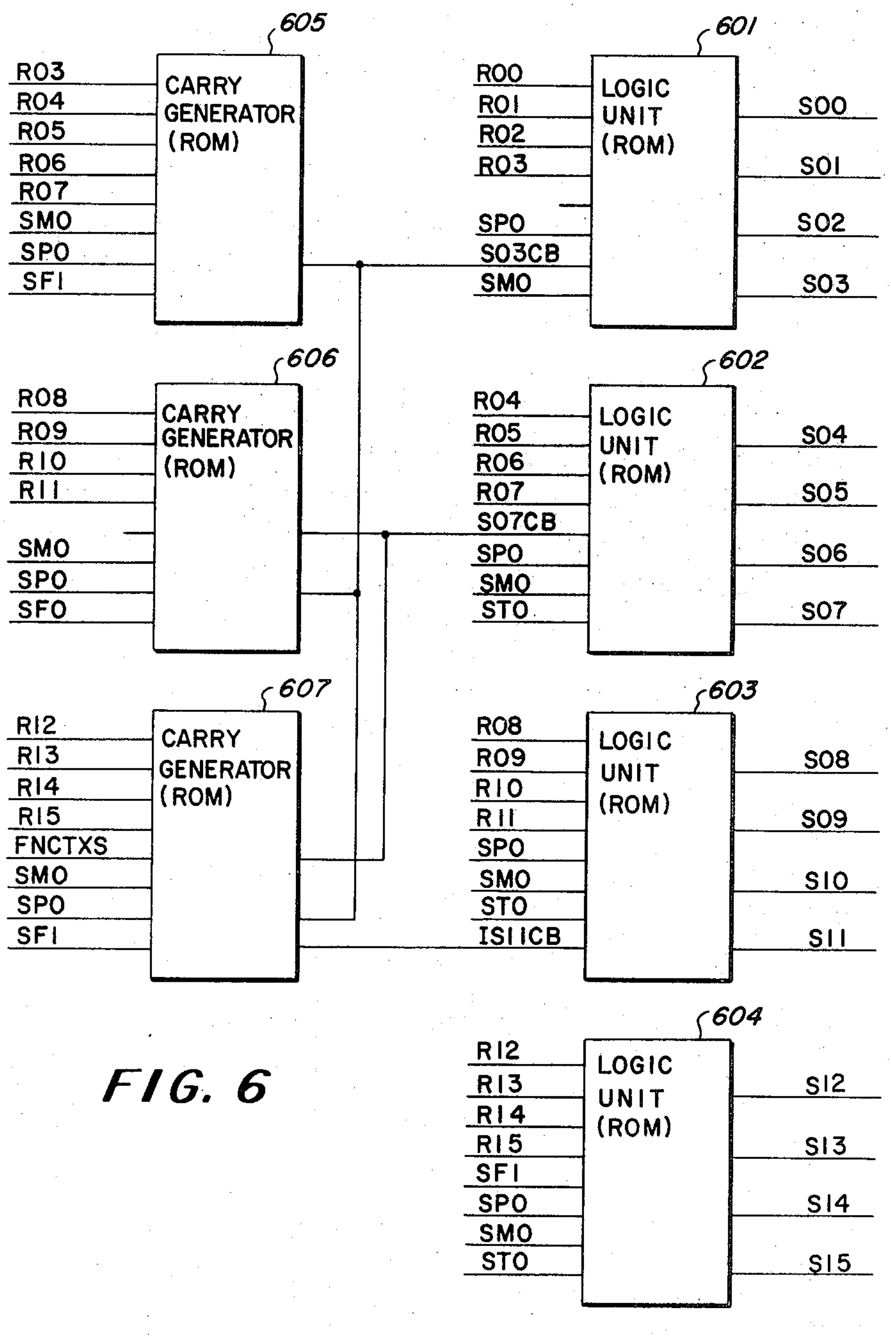

FIG. 6 is a simplified wiring diagram of the Arithmetic Unit.

Figure 7:
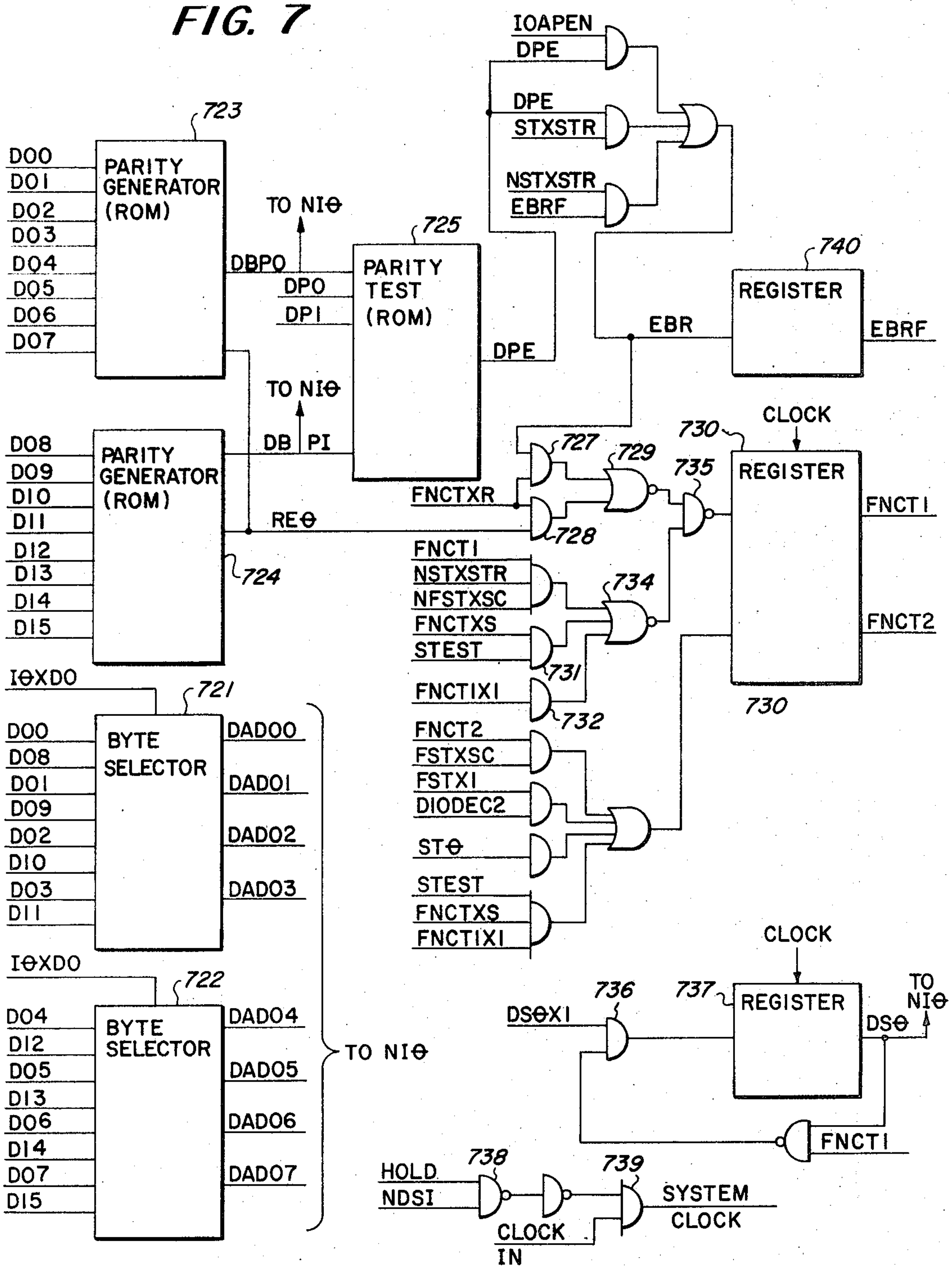

FiG. 7 is a simplified wiring diagram of the Parity Generator and Parity Test logic, and the Byte Selector.

Figure 8A:
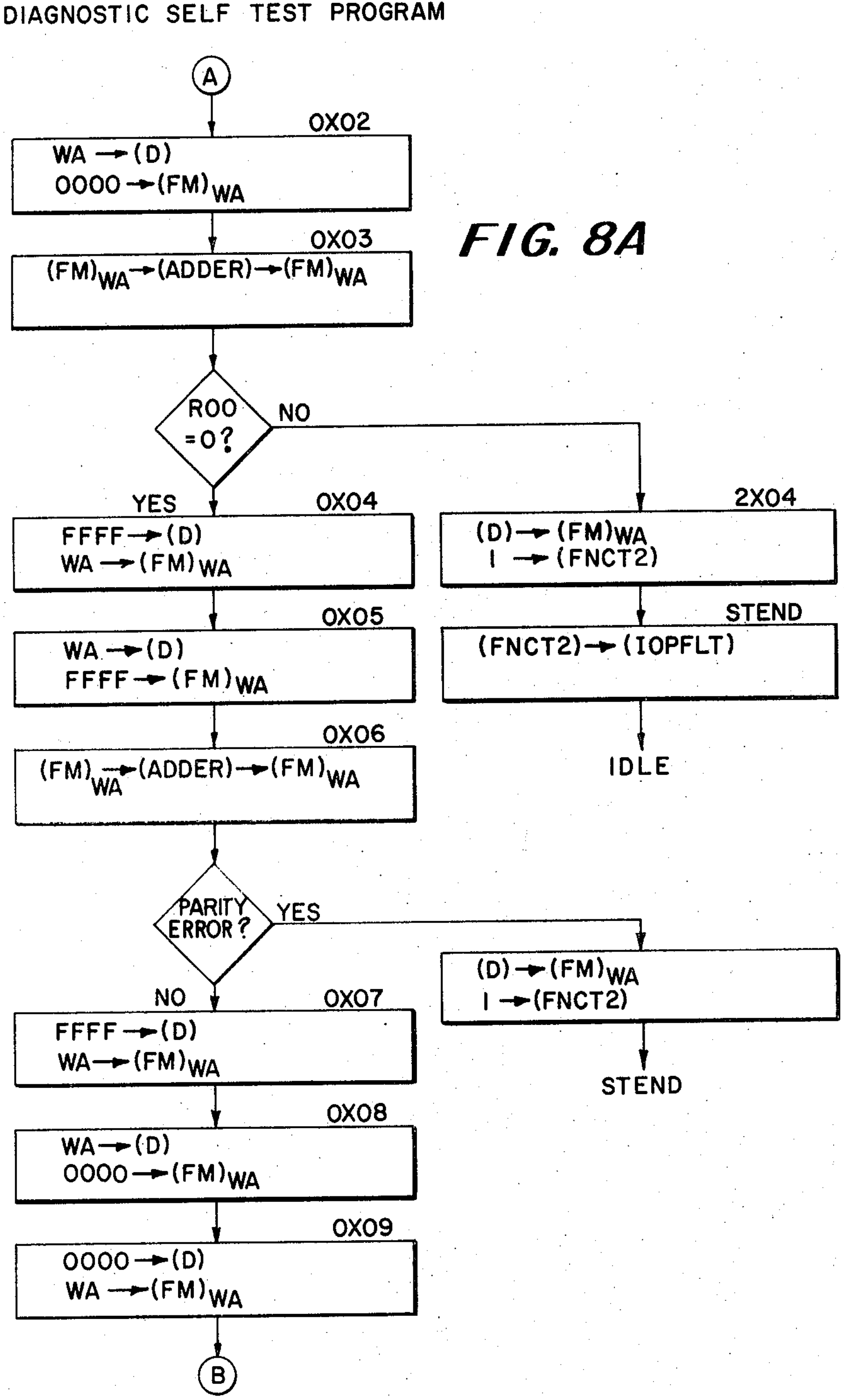
Figure 8B:
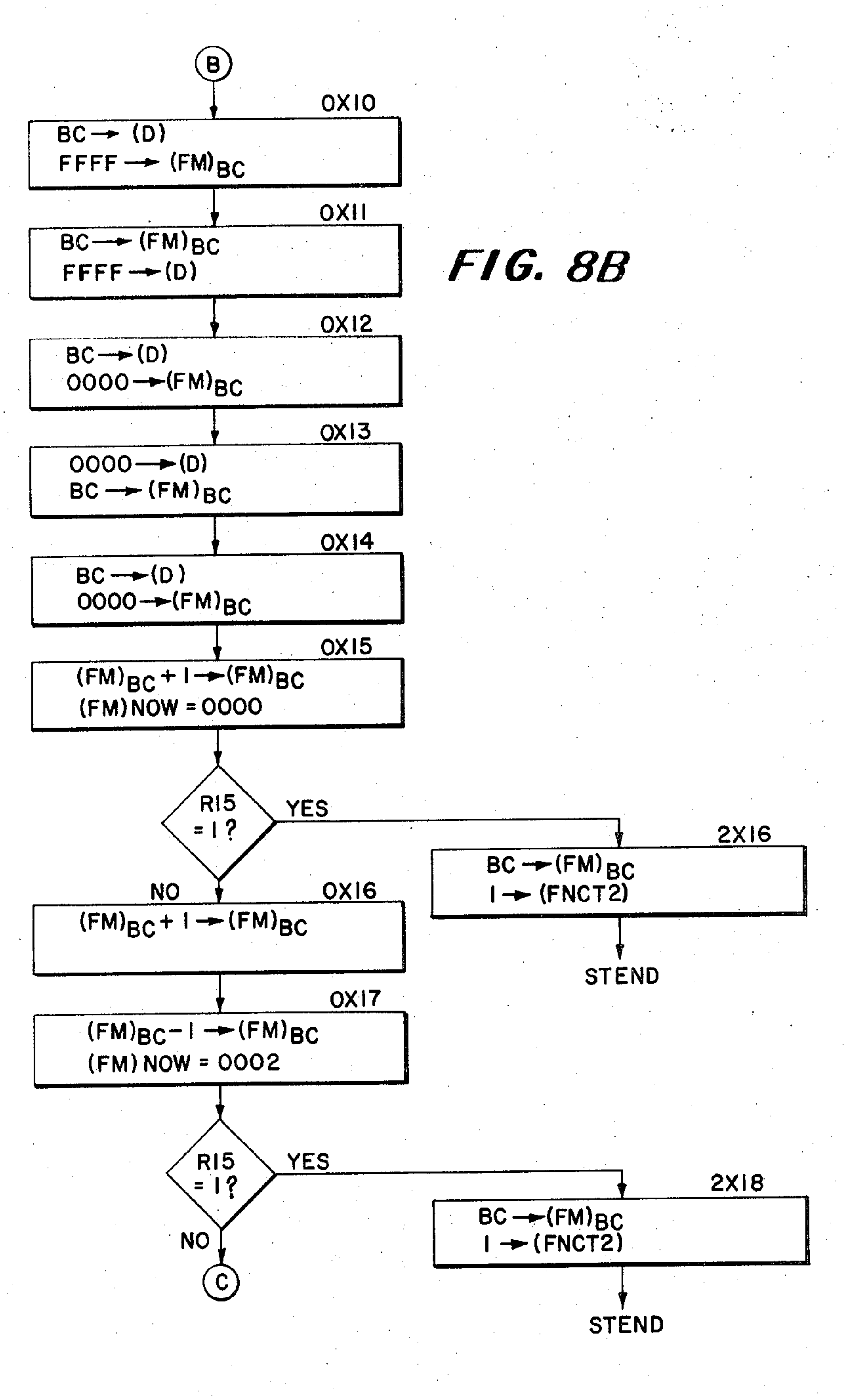
Figure 8C:
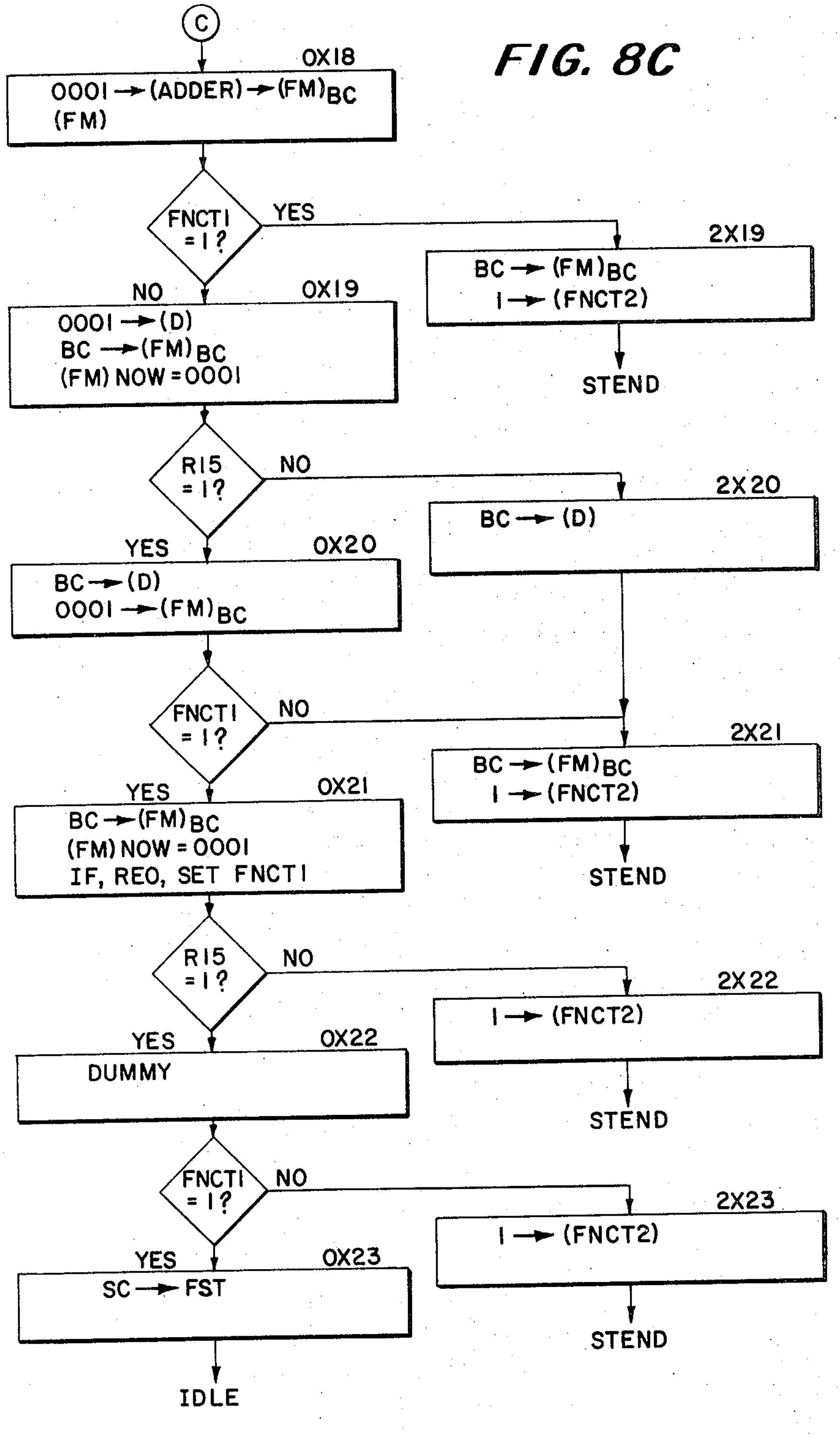

FIGS. 8A, 8B and 8C constitute a flow chart of the test microprogram.

Figures 9A, 9B:
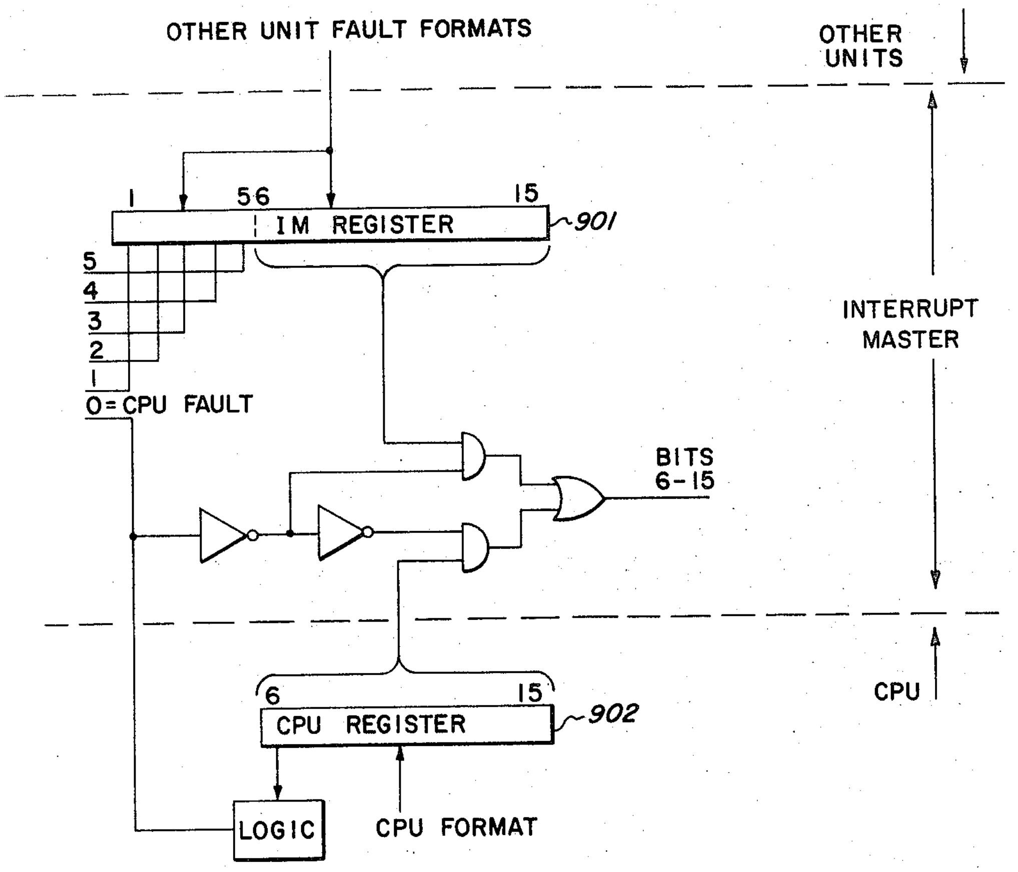

FIG. 9A is a simplified logic diagram of the Fault Register implementation.

FIG. 9B shows the format of the first six bits of information contained in the Fault Register.

FIG. 10 depicts a listing of the applicable control memory.

FIGS. 11A and 11B depict a conversion table of mnemonics to machine language.

GENERAL DESCRIPTION

Figure 1:
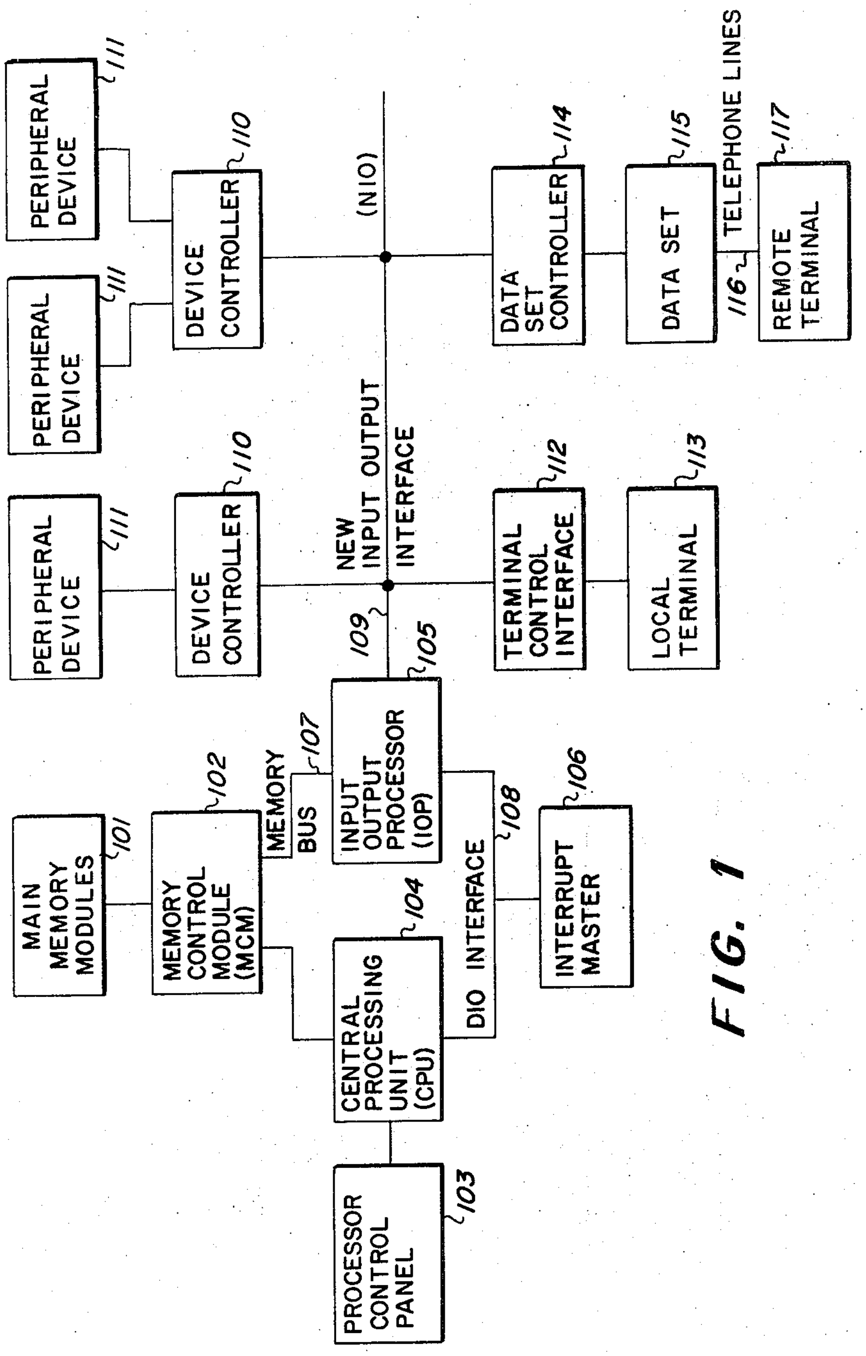
FIG. 1 is an overall block diagram showing the main components of the data processing system configured to utilize the present invention.

FIG. 1 is a system block diagram of a data processing system embodying the present invention. The Central Processing Unit (CPU) 104 is a microprogrammed CPU which interfaces with up to eight Memory Modules 101, providing a maximum of 64K 16 bit words, through a Memory Control Module (MCM) 102 which provides the appropriate interfacing logic. The CPU operates in conjunction with a Processor Control Panel 103 and the appropriate interrupt logic contained in the Interrupt Master 106.

To free the CPU 104 from the time consuming process of transferring information from and to the Memory Modules and Peripheral Devices 111, a separate Input-Output Processor (IOP) 105 was designed into this system. In this case, the IOP 105 is itself a microprogrammed CPU-type device with its own Scratch Memory and control memory. Information is transferred from a Peripheral Device 111 through a Device Controller 110 onto the New Input Output Interface (NIO) 109 through the IOP 105, through the Memory Bus 107, and through the MCM 102, to the Memory Modules 101. This transfer of information is initiated by the CPU. The CPU will send to the IOP over the DIO Interface Line 108 the appropriate command specifying the particular Peripheral Device 111, the number of words to be effected and the memory locations involved. Upon receipt of this information the IOP 105 will initiate and maintain this transfer of information with no further intervention necessary by the CPU 104. A test microprogram exists in the control memory of either the IOP or CPU. To avoid duplication of information only the IOP implementation will be hereinafter discussed.

In addition to the fault detection circuitry, every unit in the system has built-in software and hardware fault detection devices. All CPU faults are reported to a fault register in the CPU. All faults in the remainder of the system are reported to a fault register located in the Interrupt Master 106. In either case the recognition of a fault results in an interrupt which will allow the CPU to do the appropriate amount of error logging before returning program control back to its normal data processing function. These fault detection and reporting circuits and the error logging software will be described more fully below.

The local operator communicates with the system through a Local Terminal 113 which is connected to the NIO Interface through Terminal Control Interface 112. In a similar fashion a remote operator communicates with the data processing system through a Remote Terminal 117 connected to the system by Telephone Lines 116 connected to Data Set 115 and Data Set Controller 114. Terminal unit controllers designed to interface with data processing machines are well known in the art. Examples thereof are the Xerox model 7601 Data Set Controller and the Bell System Data Set 103A.

Figure 2A:
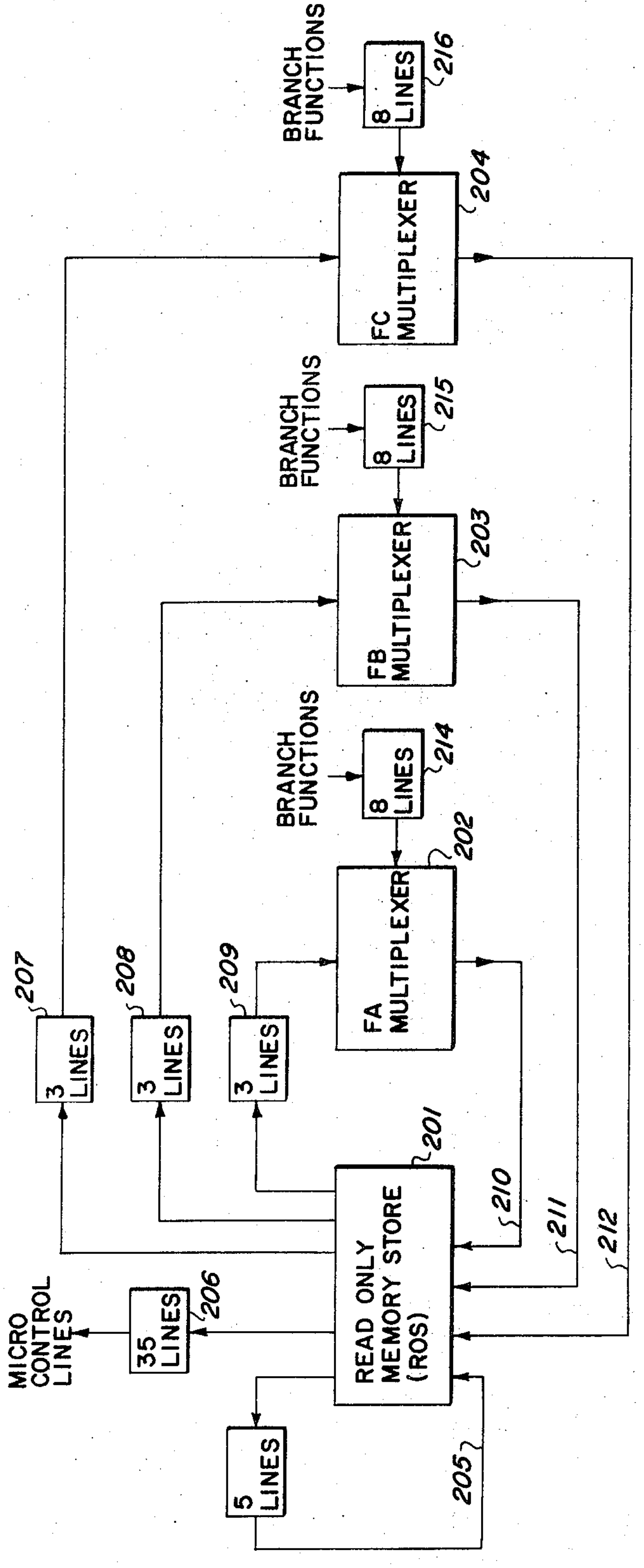
FIG. 2A shows in block diagram form the hardware required to implement the control memory and next address generator of the Input Output Processor shown on FIG. 1.
Figure 2B:
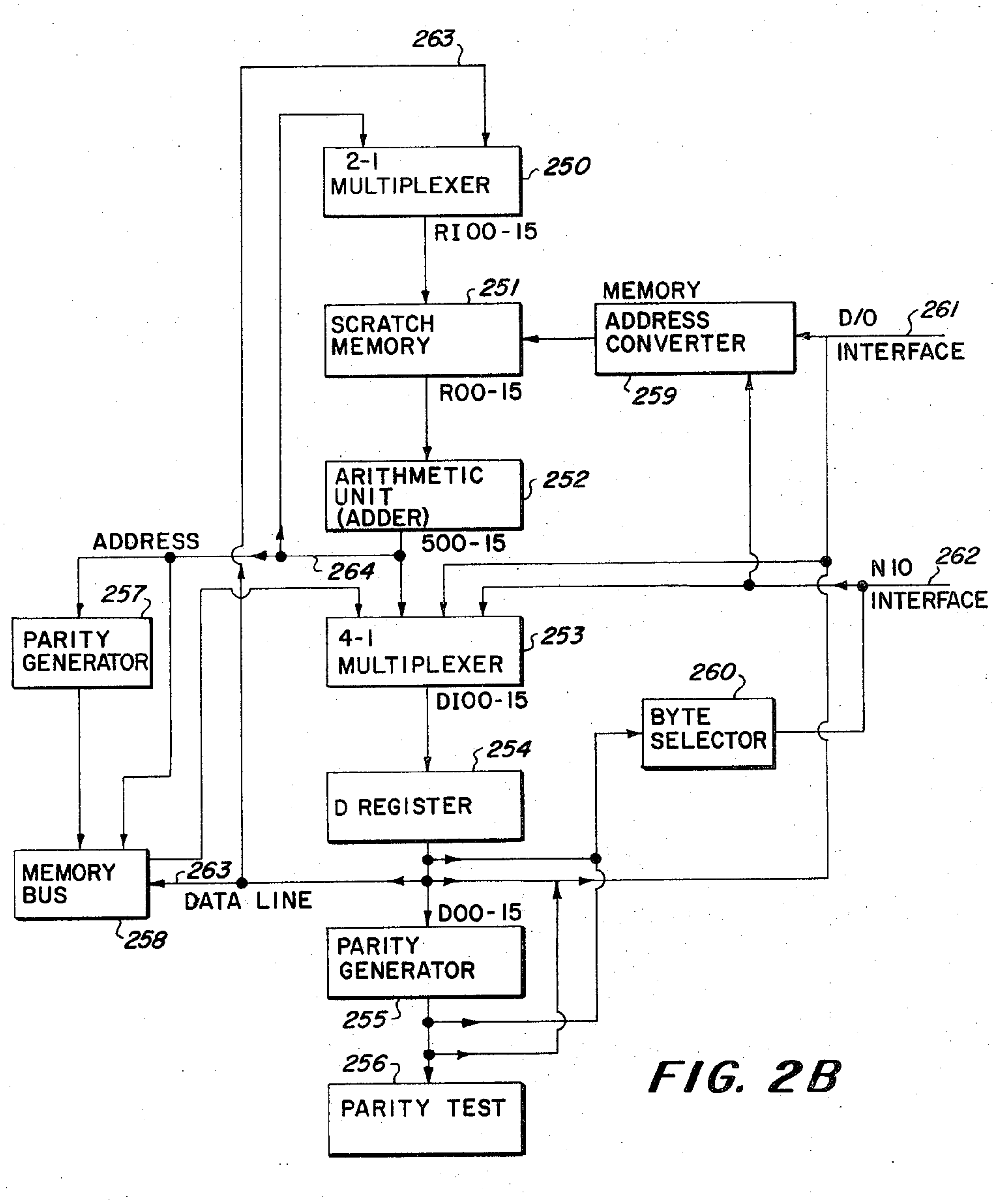
FIG. 2B shows the flow of data from the various interfaces through the main components of the Input Output Processor.

FIGS. 2A and 2B constitute an overall block diagram of the IOP wherein FIG. 2A shows the implementation of the Read Only Memory Store (ROS) 201 containing the executive program and the arrangement of the next address generating circuits, and FIG. 2B shows the paths of data flow through the IOP to the Memory Bus 258, the DIO 261 and the NIO 262 Interfaces.

In FIG. 2A the executive program which controls all of the input-output data processing is contained in thirteen read only memory (ROM) chips that constitute the Read Only Memory Store (ROS) 201. The ROS 201 is implemented so that its capacity is 256 words, each 52 bits long. Five of the output lines 205 are tied directly back to the addressing lines of the ROS to constitute the most significant five bits of the next word in the program to be accessed. Three sets of three lines each 207, 208, 209, are used to control three multiplexing chips, FA 202, FB 203 and FC 204. The outputs of these multiplexers are used to determine the three least significant bits of the next address to be accessed. Each of these three multiplexers has eight selectable input logic functions. Therefore, the program has 24 branch options in the generation of the next address. With this implementation, all contigencies relating to the executive program can be specified as multiplexer inputs which will result in a branch to the part of the executive program that was implemented to service this contingency. The thirty five remaining Micro Control Lines 206 are used to control the flow of data and information throughout the remaining portions of the IOP or are used as discrete outputs to the CPU or the Device Controller. These will be described below.

FIG. 2B shows the flow of data and address information through the IOP 105 of FIG. 1. A typical data transfer is initiated when the IOP receives from the CPU over the DIO Interface 261 an order to either deliver to or receive from some Peripheral Device 111 a number of bytes and the location of the word in Main Memory 101 corresponding to the first word of the block of memory to be affected. The address of the first word of the memory block is referred to as the word address and the number of bytes to be affected in this data transfer is referred to as the byte count. Upon receiving this information, the IOP will begin the transfer of information between the Memory Bus 258 and the NIO interface 262 with no further intervention by the CPU.

Scratch Memory 251 is implemented from eight bipolar random access memory (RAM) chips giving a total storage capability of 32 16 bit words. This storage is divided into 16 channels, each containing a 32 bit double word. The first 16 bits contain the word address of the first word of the memory block. Since the word address is 16 bits long it can designate any location in the entire 64K Memory 101. The second half of the double word contains three flags in the most significant three bits followed by 13 bits of byte count.

During a typical transfer of data as each byte is delivered to or from Main Memory the word address will be incremented by one in every second byte to point to the next word to be processed and the byte count will be decremented by one to indicate the number of bytes remaining to be transferred. These functions are accomplished in the Arithmetic Unit 252. As each byte is transferred the control memory program will cycle the contents of Scratch Memory 251 through the Arithmetic Unit 252 where the contents will be correspondingly decremented or incremented, through the 2 to 1 Multiplexer 250 and back into Scratch Memory 251. The arithmetic functions required by the IOP are available under micro program control.

The word address and byte count are received from the CPU over the DIO Interface 261 and are eventually loaded into Scratch Memory 251. However, the information received at the Address Converter 259 is in fact the number designator of a peripheral device and cannot be used directly to address a location in Scratch Memory. To make this translation, Address Converter 259, implemented from a ROM, is programmed to convert device addresses to Scratch Memory addresses so that the byte count and word address may be loaded into the appropriate channel of scratch memory. As already shown if a word is already in Scratch Memory 251 it may be modified in the Arithmetic Unit 252 and circulated on line 264 back through the 2 to 1 Multiplexer 250 into Scratch Memory. However, a different path is used to load the Scratch Memory initially. Specifically, the word address and byte count are received from the CPU over the DIO Interface 261, selected and routed through the 4 to 1 Multiplexer 253 and are clocked into the D Register 254. This information is then available through line 263, is selected at the 2 to 1 Multiplexer 250 and is clocked into Scratch Memory on the next clock pulse.

From this point on, the specified number of words can be transferred between Main Memory 101 and the Peripheral Device 111 with no CPU 104 intervention as follows. When loading Memory from a Peripheral Device the information is sent through a Device Controller 110, through the NIO Interface 262, through the 4 to 1 Multiplexer 253 and is clocked into the D Register 254 on the first clock pulse. The information is now available on line 263 to the Memory Bus 258. For transfers from Memory to a Peripheral device the data will be sent through the Memory Bus Data Line 265 to the 4 to 1 Multiplexer 253 and then clocked into the D Register 254. At this point the data will be available at the NIO Interface 262 through the Byte Selector 260.

A characteristic of the system is that the NIO Bus 262 which interfaces the IOP 105 and Device Controller 110 is a nine line bus which can handle one byte plus parity at a time, while the Memory 258 and DIO 261 Buses are 18 line interfaces handling two bytes in parallel. Thus, taking the example of a data transfer from a Peripheral Device to Memory, the bytes will be clocked in byte serially, packed into the D Register 254 and then transferred in parallel to Memory. On the other hand, data received from Memory will be loaded into the D Register and then selected one byte at a time by Byte Selector 260 to be sent on the NIO Interface 262 to the Device Controller.

The remaining parts of FIG. 2B are concerned with parity considerations. Normally data is transferred one or two bytes at a time, each byte consisting of eight bits of data and one parity bit. Whenever 16 bits of data are clocked out of the D Register 254 they are applied to a Parity Generator 255 which produces two parity bits. These bits are compared against the two parity bits that were transferred with the data. This testing process assures that the data is transmitted with no loss of information or generation of error. Whereas the logic associated with the D Register 254 does handle parity bits, Scratch memory 251 does not. Therefore, when address information goes out from the Arithmetic Unit 252 on line 264 to the Memory Bus 258 a parity bit per byte must be generated. This is done in Parity Generator 257. This parity generator is actually located in the Memory Control Module 102 but is indicated in FiG. 2B to illustrate the entire parity system.

An analysis of the IOP schematics, FIGS. 3 through 7, will proceed as follows: First there will be a discussion of the organization of the Read Only Memory Store and the circuits that generate the next program address. Second, there will be an analysis of those circuits required to implement the data flow described in FIG. 2B; that is, the flow of information and data through the IOP from and to the DIO, NIO and Memory Interfaces. Third, the control lines of the executive micro program that control the logic and data flow in the Input-Output Processor will be defined. Fourth, an explanation of the logical functions for branch options provided in the next address generator portion of the program control circuit will be given. Fifth, the actual communication between devices in a typical data transfer sequence will be described.

Referring now to the Control Memory implementation in FIGS. 3A and 3B, the executive micro program is contained in the Read Only Memory Store which is implemented from read only memory chips 305 through 308 and 312 through 320. Each of these ROM's have eight coded input lines and a four bit output giving each ROM a 256 by 4 bit capacity. Since there are 13 ROM's, the total memory capacity is 256 words with each word 52 bits long. The output lines of the ROM's are the IOP Micro Control Lines and will be discussed below. The next program address is generated by Address Drivers 301 through 304. Drivers 301 and 302 operate in parallel with drivers 303 and 304 because of line loading. The five most significant bits of the Address Driver output are determined directly from the FD field, Lines FD00 thru FD04, whereas the three least significant bits are functions of branch multiplexers 309, 310 and 311. Each branch multiplexer has eight logical function inputs and three coded control lines so that each multiplexer can select one of eight functions to supply to the Address Drivers giving the program a possible total of 24 branch options. These logical function inputs will be discussed below.

FIGS. 4A, 4B, 4C and 4D are a representation of the 4 to 1 Multiplexer 253 and D Register 254. The D Register is implemented from 4 bit data registers 402, 404, 425 and 427 and handles 16 bits in parallel. The inputs are supplied through a network of gates that function as a 4 to 1 inverting multiplexer. The inputs to this network of gates come from the Arithmetic Unit 252 or either the DIO 261, NIO 262 or Memory Interface 263. Since the multiplexing logic and the D Registers for each group of 4 bits are identical, FIG. 4C only shows the circuit detail of the first 4 bits of the second byte. Multiplexers 401, 403 and 426 are similar in construction to the network shown in gates 405 through 424. Similarly, D Registers 402, 404 and 427 are similar to D Register 425 shown in detail. It should be noted at the outset that the parity bits that normally accompany memory data and data from an input-output device are not handled through this channel. They are fed directly to the Parity Generator 255 through separate logic. Gates 405 through 409 constitute one element of the 16 element 4 to 1 Multiplexer. The control lines and data input lines for this element are as follows: DXIO is the NIO control line, DXM is the memory control line, DXS is the adder control line and DXDIO is the DIO control line. NIDAROO is one bit of NIO data. NMRDO8 is a bit of Memory data. SO8 is a bit of Adder data and NDBO8 is a bit of DIO data. It is noticed that the least significant bit of NIO data is applied to the second byte of the D Register. This is because the NIO Interface is a nine line interface handling one byte at a time. Therefore, two complete bytes from the NIO Interface must be packed into the D Register before the full 16 bit word can be sent to the Memory Bus. (Unless a partial write is required).

FIGS. 5A and B contain schematics of the 2 to 1 Multiplexer 250, the random access Scratch Memory 251 and the Memory Address Converter 259 of the IOP 105. Since both bytes are handled in an identical manner through the 2 to 1 Multiplexer and the Scratch Memory, a schematic of only the first byte has been provided. FIG. 5A shows four random access Scratch Memory chips 501 through 504, each containing 32 by two bits of information and providing a total word store of 32 sixteen bit words. The 32 words in memory contain 16 memory addresses and sixteen byte counts. Each word address points to a location in Main Memory 101 being accessed or stored into by a Peripheral Device 111, and the byte count corresponds to the remaining number of bytes that must be processed by this particular Peripheral Device. The five coded input address lines to Scratch Memory are labeled RAO through RA4 and the sixteen output lines are labeled ROO through R15. The 16 input data lines, labeled RIOO through RI15, are driven by the 2 to 1 Multiplexers 509 and 510 in FIG. 5A. These multiplexers are controlled by the micro control line, RXD, which determines whether the D Register or the Adder output will be clocked into Scratch Memory. The Adder outputs are labeled SOO through SO7 and the D Register outputs are labeled DOO through DO7.

In FIG. 5B, read only memory chips 514 and 515 are necessary to translate device numbers coming in on the DIO and NIO Interfaces into locations in Scratch Memory. This is necessary because device numbers assigned to Peripheral Devices during the generation of software do not correspond to locations in Scratch Memory. Therefore, a translation must take place. Address information comes from the NIO on line NIDAROO through NIDARO7 and from the DIO on line NDA11 through NDA14. Data Register 516 assures that the information will be clocked onto the address lines with the appropriate timing.

A function of the 2 to 1 Multiplexer chip 517 is to provide for the proper implementation of the data chaining and interrupt flags. As described above, the first three bits of the byte count word are the error flag, the data chaining flag and the interrupt flag. When processing a byte count the 2 to 1 Multiplexer 517 will select the RO1 bit and use that as the data chaining flag. It will also select the RO2 bit and use that for the interrupt flag. This selection is forced by the RA4 line which indicates that a byte count is being processed. The two output signals DC/S and IF/S are wired to Data Register 518 and the output of this Data Register are in turn wired back to this 2 to 1 Multiplexer 517. The result is that if a byte count is being processed, bits one and two will be used for the data chaining and interrupt flags. On the other hand for as long as a byte count is not processed the Data Register 518 will keep alive the appropriate status of these two flags.

FIG. 6 is a schematic of the Arithmetic Unit 252 of the IOP 105 which has been implemented to perform the following functions: pass through the data unchanged, decrement RO3 through R15 by 1, increment ROO through R15 by 1, force all output bits to 1, or invert ROO through R15. Normally a 16 bit arithmetic unit is composed of four four bit arithmetic logic unit chips. However, in view of cost considerations and the limited arithmetic function capability required in this case the arithmetic unit was instead implemented with 7 ROM's. To demonstrate the operation of this arithmetic unit it is shown that, under microprogram control, the SPO line is active requesting an increment by one of the input data. ROM's 605, 606 and 607 only generate carry data. The actual conversion, in this case the actual incrementing by one, is done in ROM's 601 through 604. The least significant bits are contained in ROM 604 which is set up so that the output data is always one greater than the input data. If in fact the inputs R12, R13, R14 and R15 are all ones then a carry should be generated and this is done in ROM 607. The carry generated is applied to ROM 603 on oline IS11CB which forces out an incremented count in that ROM. Furthermore, if RO8 through R15 are all 1's then carrys will be generated in both ROM's 606 and 607 and applied to ROM 601 and 602. Finally, if all bits RO4 through R15 are 1's a carry will be generated and sent into ROM 601. In all cases the output will be incremented by one from the input.

FIG. 7 is a schematic of the output lines going to the NIO Interface 262, and Parity Generator 255 and the Parity Test 256. The 16 data bits from the D Register DOO through D15 are fed into Byte Selector chips 721 and 722. Multiplexing is necessary in this case since the NIO interface can only handle one byte. Therefore, under micro program control, the data is clocked out one byte at a time. The parity bits are generated in Parity Generators 723 and 724 and sent out on lines DBPO and DBP1. When data is loaded into the D Register from the DIO, the NIO or from memory it will normally be accompanied by one parity bit per byte. These two parity bits, DPO and DP1 appear as inputs on ROM 725. Simultaneously, the D Register outputs are received at the inputs to ROM's 723 and 724 which also generate parity bits DBPO and DBP1. These four parity bits are sent into ROM 724 which is mechanized to show any partiy error. The parity error bit goes out on line DPE, and under micro program control can be clocked through Gate 726 to appear on line EBR, the error branch flag line.

Returning to the Control Memory schematics, FIGS. 3A and 3B, the flow of information and data through the Input Output Processor is controlled by the executivemicro program located in the Read Only Memory Store, and more specifically each function of the Input Output Processor is controlled by one of 49 control lines emanating from the Read Only Memory Store. The functions implemented by these control lines are as follows.

The RXD line controls the 2 to 1 Multiplexer 250. If RXD is high, Scratch Memory 251 will be loaded with the contents of the D Register 254. If RXD is low, the output of the Adder 252 will be loaded into Scratch Memory. This line is shown as FIG. 5A as an input to the 2 to 1 Multiplexer 509 and 510.

RA4X1 is a byte count preset select of RA4. RA4 is an input to Data Register 517 in FIG. 5B which was discussed previously with reference to the data chaining and interrupt flags. The same line is also used as the least significant bit in the random access memory addressing scheme in FIG. 5A. Thus byte counts will always be loaded into odd addresses in Scratch Memory.

The RAXIN allows the Address Converter 259 to translate the device number coming in on the DIO Interface into a Scratch Memory location. This line is an input to Data Register 516 in FIG. 5B, the output of which enables the outputs of Address Converters 514 and 515 to be clocked onto the Scratch Memory address lines.

RWX1 is the Scratch Memory preset which is an indicator that a word address or byte count will be updated on the next clock pulse.

The SMO line enables the output of the Adder 252 to be decremented by one from the input. This line is one of the inputs of ROM's 601 through 607 in FiG. 6. The SPO line is similar to the SMO line except that the output of the Adder will be incremented instead of decremented. The STO line enables the output of the Adder to indicate a termination of the data transfer by one of five types of terminal orders. The SMO, STO and SPO lines are used in concert to cause the output of the Adder to generate the appropriate terminal order. The first is where the data transmission has been interrupted by a higher priority occurrence but will be resumed after the interrupt has been serviced. The second occurs as a result of the byte count going to zero. The thrid is a simple halt of the data transmission. The fourth is a halt because of a connection error and the fifth is a terminal order based on an interrupt and a halt where it is not expected that the data transmission will be resumed after the interrupt is processed. These are the five types of terminal orders that could be sent out under all possible conditions and are necessary so that the Device Controller can efficiently go on to its next task.

The next five control lines constitute the DC field of the microprogram output. These lines control the 4 to 1 Multiplexer 253 and therefore determine what will be loaded into the D Register in FIG. 4C. The DXS line allows data to be loaded into the D Register from the Adder 252. The DXDIO line allows two bytes of data from the DIO data bus to be clocked into the D Register. The DXIO line allows data to be clocked into the D Register from the NIO Interface 262. However, the NIO Interface processes one byte at a time and therefore a decision must be made as to which half of the D Register this NIO data will be loaded into. This decision is taken care of by the next two lines DOINH and D1INH each of which inhibits one half of the D Register allowing the Data to be clocked into the other, correct, half of the D Register.

The next three lines constitute the IT field and control tests that occur during an IO communication. FSTXSC has the logical function of clocking the service call into the FST flip flop 518 in FIG. 5B when the service call from the device is high. This FST signal is used in the FC Mux 309 in FIG. 3A to control branching of the program to a subroutine that will process this service call. FNCTXR which is applied to gates 727 and 728 in FIG. 7 allows the setting of line FNCT1, an output of Register 730, under one of two possible conditions; either line EBR, one input to gate 727, is high indicating an error branch condition or REO, a parallel output of ROM's 723 and 727, is high indicating that the byte count is a one. In either case the significance of FNCT1 will be that the next transmission will be the last one in this series of data transmissions. This feature is also used in Self Test, described later. FNCTXS strobes the results of the Adder test of the byte count into the FNCT1 flip flop 730 through gates 731, 734 and 735. FNCT1 will be low if the byte count was not 1. The FNCT1 line is available at the FC Mux to provide branches to appropriate subroutines in the executive program.

Continuing the discussion of the FIG. 3 control lines, the next two lines constitute the IF field. FNCT1X1, applied to gate 732, simply sets the FNCT1 flip flop 730 high. This exists as an option for the microprogrammer in the generation of his executive program. Similarly FSTX1, an input to register 518, sets the FST line high. This will be discussed further in the discussion of the communication between Device Controller, CPU and IOP during a normal data transfer.

The next five lines, constituting the IO field, are a continuation of that set of communication control lines that are necessary for data transfer. TMX1 in FIG. 5B forces the IOP into one of two turn-around modes. One or both could be set depending upon the contents of the D Register when this flag is received. These levels of IOP testing exist as executive program subroutines and proceed as follows.

The first level of testing consists of sending data in from the NIO Interface 262 through the IOP and back the the Memory Control Module 102 by setting FST high, FIG. 5B, Gate 520. This tests the IOP-to-Memory logic paths, some of the IO interface paths and the micro code (referred to as internal turn-around mode). The second turn-around-mode level is used in conjunction with the system level diagnostic software which will exercise the complete data transfer capabilities. This is accomplished by a turn-around in an external controller attached to the NIO Interface. The IOXDO control line is an input to Data Register 721 and 722 in FIG. 7. It controls which of the two data bytes contained in the D Register will be sent out on the one byte NIO Interface. If this line is high the first byte is sent out and if this line is low the second byte is sent out. The DSOX1 line sets the DSO flip flop 737 in FIG. 7 when it's high and resets it when it's low. The DSO flip flop is a repeater flip flop which just looks at line DSOX1 which will be high if the data received or sent out by the IOP is valid. The Hold line is applied to Gate 738 in FiG. 7. The purpose of this line is to stop the clock in the IOP until a DSI is received. The DSI control line is a communication to the Device Controller 110 and is used when the IOP has completed a data transmission to the Device Controller and is waiting for a signal from the Device Controller that the Device Controller has processed the data and is now ready for the next transmission. IRELX1 is used as part of the priority logic. Normally any DIO transmission has priority over an NIO transmission. However, a problem occurs during the time that control is being passed from one Device Controller to another. For this one clock period the IRELX1 is active to release the priority logic and enable the next Device Controller to get connected for service before allowing the passibility of higher priority DIO service call from being acted upon. FC Mux 309 input, ISAMP/EN is a logical function of IRELX1 and results in a branch to a control memory executive subroutine.

In FIG. 3B the next four lines, constituting the MI field, control the Memory Bus 258. The LXS line goes to an IOP address register and allows the output of the Adder, which in this case is a word address, to be clocked onto a memory address register, and then to the MCM 102. These registers are associated with the Memory Bus 258. MWOX1 and MW1XL preset flip flops which are also sent to the MCM and are the two byte control lines that allow each byte to be written independently of the other. When both are true, both bytes are being written into Main Memory. When both are low, both bits are being read out of Memory and in the combination cases there is a capability of doing a partial write. The IOP control memory program has the ability to microprogram these four possible Memory operations. The last term in the MI field is the MRX1 line. This presets a repeater flip flop and is sent to the Memory Control Module as a memory request to let the Memory Control Module know that the next cycle will request data access to or from Memory.

The next five lines constitute the DI field. This field controls the DIO Interface. Line CC3X1 and CC4X1 either set or reset condition code lines which are carried back to the CPU and are used to set or reset the overflow and carry bits. These two bits are not used in their nominal functions during data transfer and are therefore available for communication and logical functions during data transfers. For example, if the overflow and carry bits are both set the significance is that the peripheral device code was not recognized by the Device Controller. The DFSAX1 line presets a repeater flip flop which drives the acknowledge line sent out to the CPU to inform it that the IOP has received and sent back a response on the DIO Interface. DIOXD1, DIOXDO route the appropriate half, or both halves of the D register onto the NDIO data Lines (NDB's) during a read direct from the CPU. In particular, DIOXDO, when true, directs the most significant byte of D to the most significant byte of the DIO data buss.

Continuing in FIG. 3B, the next three lines constitute the ST field. The DPEN line enables the IOP to perform a controlled parity check from the contents of the D Register. When it is low the parity check is disabled. This is necessary since there are times during normal operation when there are random bits in the D Register. This line then enables a parity check only when the contents of the D Register are appropriate to the parity bits that are available to the parity test circuit at that time. STXSTR is a control line that is only used during self test to perform functions that are unique to self test conditions. One function is to zero the self test flag. The self test flag comes up 60 times per second and embedded in the self test program is this instruction which will zero that flag out again. This line also clocks the parity error output from the parity test circuit 725 in FIG. 7 onto the EBR or error branch line. This puts a parity error in the appropriate form to be acted upon by the FC Mux 309 in FIG. 3. This error branch signal is kept alive by repeater flip flop 740 in FIG. 7 and can be interrogated at a future time by the control memory program. The STXSTR line also initializes the FNCT1 line from register 730 in FIG. 7 so that FNCT1 can be used repeatitively to test for errors during self test.

The IDLE line is used as a logical indicator to show that the executive micro program is in its idle state and is prepared to process service calls. The remaining control lines constituting the FA, FB, FC and FD field are used for control of branch options in the program and have been explained in conjunction with the schematic discussion of FIG. 3.

In the discussion of the schematic diagrams it was stated that the FA, FB and FC Multiplexers had the capability of selecting from 18 logical functions which could be used for branches in the executive program. A discussion of these 18 logical functions follows. At the outset it should be noted that every multiplexer has one input left high and one input grounded. This is to allow the microprogrammer to control the output of each multiplexer so that it will either represent a high, a low or a function.

In FIG. 3A, the first logical function line is FNCT1. This is an end-data signal and allows micro control branching on an end-of-data signal generated by the IOP. The IOP-generated end-of-data signal, REO on FIG. 7, is an output of ROM's 723 and 724. When the D Register contains a byte count, and it is equal to 1, REO is generated to indicate that the next transmission is the last word. EBR is an error branch condition originating in a parity error detected at the parity test circuit 725 in FIG. 7. The micro control line FST goes high when a data transfer is requested. This signal is inspected when the IOP is in its idle loop and originates a data transfer. ROO is the most significant bit of the output of Scratch Memory. When the byte count is being processed, however, the significance of this bit is as an error flag. Therefore, a branch on this bit is in fact a branch on an error. ISAMP/EN is an indication to the IOP that the device under control is responding to an AIO command and allows a branch on that condition. An AIO command in this system is issued by CPU as a result of an I/O device generated interrupt which causes the I/O device to identify itself. IDIODECO, 1 and 2 are terms used by the microprogrammer as branch controls. ISRV1 is a "not end data" signal received from the device controller to indicate that the data transfer process is continuing. FNCT2 is an end service flag from the IOP to the Device Controller. It is a communication to inform the device that the transmission of data is completed or terminated because of an error. IDIOMODE is a control line decoded from the DIO indicating that the IOP is to process a recognized DIO instruction of some type. It is used as a branch control when the IOP is in idle. The IDX2 signal is received from a Device Controller and is an indication that the Device Controller is processing two bytes per service instead of one. The IF flag is the interrupt flag. It is part of the order byte, derived from the third flag bit in the byte word, and indicates to the IOP that an interrupt should be generated after completion of the current data transfer.

The RODD line will be high if the contents of Scratch Memory is an odd number. This is useful in the self test program which will be discussed below. ISELFT is set by the self test timer flip flop once every 16.6 milliseconds. This flag is tested in the process of deciding to branch to self Test. NDA15 is the least significant bit of the effective address of the DIO interface and is used by the IOP during a writing or reading channel function. The CPU sends the data and address on the DIO Interface, and the IOP decides whether it's an even or odd channel by looking at the least significant bit of the address. ISRVO is an end-service flag from the Device Controller. When the IOP is getting connected to a Peripheral Device for service, this flag is used in connection with the ISRV1 line discussed above to tell the IOP what type of operation it is going to do, that is, whether it is an order in, an order out, a data in or a data out. In this case the IOP must look at both ISRV1 and ISRVO to determine which of the four possibilities is in order. The DC line is the data chaining flag associated with the device being processed currently. When the byte count reaches zero the presence of the data chaining flag will automatically initiate data transfer from the new word address and based on the new byte count.

A typical transfer of information from Main Memory 101 to a Peripheral Device 111 will be handled in the following manner. First the CPU will load a word address and byte count into one channel of Scratch Memory 251. This is done with a "write direct" assembly language instruction which transfers the contents of the CPU accumulator into the appropriate IO channel of Scratch Memory. In this case the address of the device is decoded through the Scratch Memory Address Converter 259 onto the Scratch Memory addressing lines while the data, in this case the word address and byte count, are clocked through the D Register 254 and into Scratch Memory. The CPU will next execute a "start IO" command. Functionally this command is used to initiate an input or output operation and must specify the device selected by the device number contained in bit positions 8 through 15 of the CPU accumulator. When this command is received by the IOP it is sent directly out to the Device Controller on the NIO Interface. If the particular device requested is connected to the Device Controller then the Device Controller will return a response through the IOP to the CPU. This response consists of two parts. The first part is the device status which is contained in an eight bit byte and will be loaded into bits 0 through 7 of the CPU accumulator. These bits are coded to show several possibilities as, if the device is ready, busy, unavailable, not operational, etc. The other half of the response is a setting or resetting of the overflow and carry flip flop in the CPU. As stated above, the overflow and carry flip flops are not being used as such during data transmission. Therefore, they are available to transfer information about the IO address, namely, whether the IO address was recognized by the Device Controller and if recognized, can the " start input-output" command be accepted. If the response is positive the "start input-output" command has completed its operation and the Device Controller will now issue a service call which results in the setting of the FST flip flop 518 on FIG. 5B. This signal is an input to FC Mux 309 in FIG. 3 and results in a branch to the appropriate part of the control memory executive program. The IOP will acknowledge this service call by raising line FST, driving FNCT0, FNCT1 and FNCT2 low. This particular arrangement of control lines extends to the Device Controller and is recognized as an acknowledgement of the service call. The device will also send two coded bits in on line ISRVO and SRV1, while driving DSI. These lines are inputs to the FB Multiplexer 310 and FC Multiplexer 309 controlling a branch to that part of the executive program that will initiate an "order out." This process results in the fetching of the first word in the data block to be transmitted which is in fact an order byte. The order byte preceeds the first word of the data table and is coded to specify the kind of operation that is being requested. The possibilities are write, read, read backward, control, sense and stop. In the example we are dealing with we will assume a read command. Upon receipt of this command the Device Controller will now raise service call a second time and this time begin the actual data transfer sequence resulting in the entire table of data being read out of Main Memory 101 and into the Peripheral Device 111.

Contained within control memory is a test microprogram that will be performed 60 times per second. FIG. 10 is a listing of this program and shows the symbolic and actual address of each line and the contents of the thirteen microprogrammed fields. This listing should be read in conjunction with FIG. 11 showing the conversions from mnemonics to hex machine code. To illustrate this process, let us examine the first line of the symbolic listing. The symbolic label OXO2 corresponds to the hex address 9A. The RC field contains an RWRXD mnemonic which means that the RXD and RWX1 micro control lines will be active. The SC field contains an SINV. However, there is no control line with that label. FIG. 11 shows that SINV has the machine code equivalent of 1101 which in turn translates into three micro code mnemonics SMO, SPO and SF1. Therefore, this one word in the SC field of the listing means that the above three control lines will be high. The FA, FB, FC and FD fields are shown blank but they will actually contain code in the machine language listing since these fields must designate the next program address which in this case is 9B, 1001 1011. The five most significant bits will be contained in the FD field. The FB and FA fields must generate ones which is done by applying a code of 001 to the FA and FB fields thereby selecting input number four which is high. FC will be programmed with a 000 to select the low input, which will be used as the 3rd least significant bit of the address. In this way the FD, C, B and A fields will generate the next address, 9B. To keep the listing less cumbersome and more easily understandable, instead of the F fields being written out in their machine code, the listing simply shows the next symbolic label, in this case OXO3. These four fields will have a symbolic listing entry only if a branch decision is involved. For instance, an FC field entry of FNCT1 will contain the binary machine word 100 since in this case the FC multiplexer is selecting the FNCT1 input line as its branch function. The result of this particular set of microcode instruction is as follows. The SINV mnemonic coupled with the DXS mnemonic will result in the contents of the arithmetic unit being inverted and loaded into the D Register thru the inverter multiplexer. STXSTR will zero the self test flag, the program will branch to location 9B because of the contents of the F field; and the RWRXD will preset a word address so that the contents accessed from Scratch Memory next time will be accessed from a word address location. RWRXD also transfers the contents of the D Register to Scratch Memory.

The entire test microprogram can be more readily discussed with reference to the flow chart in FIG. 8. Initially the D Register will contain all zeros since it is zeroed out by the executive micro program when entering the test microprogram. Also the Address Converter will contain that address corresponding to the last device accessed by the program. Assuming these initial conditions the test microprogram will exercise the ability of the IOP to transfer zeros through the loop comprising Scratch Memory 251, the Arithmetic Unit 252 and the 2 to 1 Multiplexer 250 in FIG. 2B. First the initial, or original word address is stored into the D Register. As seen in the symbolic listing the contents of Scratch Memory is inverted through the Arithmetic Unit to compensate for the fact that the 4 to 1 Multiplexer 253 is itself an inverter, therefore, the word address is stored properly into the D Register. Next, the zeros that were contained in the D Register are loaded into the Scratch Memory address. At OXO3 the contents of Scratch Memory, in this case zeros, is circulated through the Adder 252, through the 2 to 1 Multiplexer 250 and back into scratch Memory 251. Of course it should be unchanged. At this point the program tests the most significant bit of memory data which should be a zero. If it is not, the program branches to location 2XO4 where the initial word address is restored to Scratch Memory, the FNCT2 flip flop is set indicating an error and the program branches to location STEND which strobes the FNCT2 flip flop bit into the IOP fail flag. If the test at OXO3 passes, the program resumes at location OXO4 which is the beginning of the test to circulate ones through the Scratch Memory loop. At OXO4 the contents of Scratch Memory is loaded into the D Register through the inverting Multiplexer 253. Therefore, the contents of the D Register will be FFFF (or all ones). At OXO5 these ones are loaded into the Scratch Memory and at OXO6 are circulated through the Adder and back into Scratch Memory. Then there is a test for a parity error. In fact the parity error is only a test of the D Register contents and therefore the circulation of ones at program location OXO6 is not tested by this parity error test. However, if the contents of Scratch Memory after the circulation of OXO6 is incorrect this will be caught later on in the program. In case of failure, the program branches to location 2XO7 where the initial word address is restored to Scratch Memory and the FNCT2 flip flop is set. The program then branches to STEND described above.

The program at location OXO7, OXO8 and OXO9 tests the IOP's ability to transfer all ones and all zeros through the entire loop comprising Scratch Memory 251, the Arithmetic Unit 252, the 4 to 1 Multiplexer 253, the D Register 254 and the 2 to 1 Multiplexer 250. Any errors generated in this part of the program wil be detected later in the program.

FIG. 8B is a test of the byte control logic. From the listing in FiG. 10 at location OXO9 it can be seen that the RC field contains the mnemonic RW4XD. FIG. 11 indicates that this mnemonic contains within it the submnemonic RA4X1 which is the byte count preselect. Therefore, from the listing it can be seen that the byte count functions will be exercised from now on in the test microprogram. Steps OX10 through OX14 exercise the ability of the logic to transfer all ones or all zeros through the entire loop comprising the Scratch Memory elements and the D Register elements. OX15 exercises the Arithmetic units capability of incrementing contents of Scratch Memory by one. If all of the preceeding steps in both FIGS. 8A and 8B have been executed properly the number contained as a byte count should be 0001. This is tested by looking at the least significant bit of Scratch Memory data which is the equivalent of asking if the Scratch Memory word is an odd number. If the byte count at this point is not an odd number, the test failed and at location 2X16 the byte count is restored to Scratch Memory, the fault flip flop is set and the program branches to Self Test End. If the byte count at this point is an odd number, the test continues. At location OX16 and OX17 the byte count is incremented and then decremented. The byte count should again be an odd number. OX18 tests the Adders ability to circulate a nonzero number through the Scratch Memory loop. The test at this point is made on the FNCT1 line. As described above, this line will be high when there was a byte count of 0001 or a parity error detected from the D Register contents when FNCTXR was programmed. It should here be low. OX19 through OX21 tests the ability of the system to circulate a non-zero number, in this case a one, through the large loop comprising the Scratch Memory and D Register circuits. The tests are either that the Adder contains an odd number or that the byte count is one. OX22 is a spare location. Finally, at location OX23 the service call is clocked onto the FST line to enable the IOP to process a data transfer if one is requested from a Peripheral Device.

The fault reporting system, providing sixteen bits of fault information, is shown schematically in FIG. 9A. A fifteen bit IM Register 901 is contained within the Interrupt Master and a 1 bit CPU Register 902 is contained within the CPU. This information is divided into two fields. The first field identifies the unit reporting the detected fault and is composed of six bits, 0 through 5. The second field identifies the unique nature of the detected fault and is composed of the remaining 10 bits, six through 15. Each bit of the unit field is uniquely associated with a specific component as shown in FIG. 9B. The system fault register will be implemented in the Interrupt Master in order to facilitate communication with all of the central system units. In the case of a dual CPU configuration each CPU will have its own system fault register associated with it. In addition, every CPU will contain an intimate CPU fault register identical in format to the system fault register but only containing ten bits. In either fault register the ten bits of information may be further divided into subfields to allow for expanded use of this fault reporting structure. For example, bits 6 and 7 could be used to specify one of four fault modes. For each of these four fault modes the remaining eight bits could represent fault information unique to the unit reporting that fault and unique to that fault mode. In this case there would be a possibility of 32 kinds of unique fault indications as opposed to the original 10. In the case of memory reporting a fault, the three high order bits of the address associated with the memory request producing the fault must be reported along with the unique identification of fault type. This would indicate in which of eight memory modules the fault occurred.

The result of a fault reported to the fault register is an immediate generation of an interrupt driving the computer to the wait state. This interrupt is generated by ORing together bits 0 through 5. If a fault has been reported one of those bits will be high and an interrupt will be generated. The computer is driven to the wait state upon a receipt of a fault interrupt to insure the preservation of all conditions until after the logging of all appropriate information by the interrupt subroutine.

When error logging is accomplished the control of the CPU is given back to the operating program.

The error logging subroutine will execute a read direct instruction, with the fault register named as the operand. If the CPU fault bit is high this "read direct" will result in the reading of the CPU fault register. If the CPU fault bit is low the Interrupt Master fault register will be read. If both registers contain failure information the interrupt subroutine must issue two "read directs" to read out both fault registers. The reading of a fault automatically rests information in that fault register to zero.

Error logging is the process of the timely collection of sufficient error information which satisfies all users and is not limited to hardware detected errors but also includes errors which are detected by the software. The information about an error, through interpretation, can reveal the most probable cause of the error. The error log must contain sufficient information to support both hardware and software maintenance requirements. In case of intermittent errors or interaction problems, isolation to the cause of the error is difficult to achieve. However, the accumulation of enough data may point out a trend which is helpful in isolation. Timely status gathering is important in order to obtain all error status before the next error occurs. Every entry in the error log should contain general information such as how the error was detected, date, and time (in milli-seconds) and what program, by job number, was affected by the error, as well as the program status word and fault register content. In addition, for an I/O fault the log should contain the device number and status.

If a malfunction occurs in the CPU resulting in a "hang," the indication of the error causing the failure can be seen locally at the control panel by switching the mode switch to the Fault Mode. The contents of the fault register are then directly viewable at the control panel.

In the foregoing, there has been disclosed methods and apparatus for continuously testing circuits associated with a microprogrammable control memory of an input-output processor. While the discussed circuits have been described in conjunction with specific logic circuitry, such circuitry is exemplary only as other circuits and apparatus could be utilized to perform the disclosed functions. For instance, the disclosed method could be applied to central processors, device controllers or any other data processing system component containing a microprogrammable control memory. Also, DTL and TTL logic, or positive or negative logic, could be used to implement circuitry to perform the disclosed functions.

The invention is not limited to the embodiments described above but all changes and modifications thereof not constituting departures from the spirit and scope of the invention are intended to be covered by the following claims.

What is claimed is:

1. In a data processing system incorporating a central processing unit (CPU), main memory, and an input-output processor capable of loading a diagnostic program from a peripheral device into main memory, wherein said CPU comprises a control memory for storing and executing microprograms contained within said control memory to order said CPU through the steps required to perform said CPU's arithmetic and logic functions, and data registers for storage of data being operated on by said CPU, the combination comprising:

a test microprogram contained within said control memory of exercising circuits within said CPU and generating fault information therefrom, circuit means contained within said control memory for periodically executing said test microprogram, fault register means coupled to said circuit means for recording fault information generated by said test microprogram, and wherein said CPU further comprises transfer means for transferring said fault information and the contents of said data registers into said main memory for storage therein.

2. The combination of claim 1, wherein said fault register means further includes interrupt means responsive to the detection of a fault for generating a system interrupt, a set of instructions in main memory for ordering said transfer of said fault information, and further CPU circuit means responsive to said system interrupt for initiating execution of said set of instructions.

3. The combination in claim 2 including:

software check-sum routines contained in main memory for testing transmission of data between peripheral devices and main memory, parity fault detection circuits responsive to the number of bits in words being processed by said CPU and contained within said CPU for testing parity of words being operated on by the data processing system, and means responsive to the detection of a fault by said software check-sum routines and said parity fault detection circuits for reporting said fault to said register means.

4. The combination in claim 3 including:

terminal means remote from said data processing system site and coupled through telephone lines and through said input-output processor to said main memory for reading out said fault information and the contents of said data registers.

5. In a data processing system incorporating a central processing unit (CPU), main memory, an input-output processor capable of loading a diagnostic program from a peripheral device into main memory, a remote terminal coupled to said CPU through telephone lines and said input-output processor, wherein said CPU comprises a control memory within said CPU for storing and executing microprograms contained within said control memory to order said CPU through the steps required to perform said CPU's arithmetic and logic functions, and data registers for storage of data being operated on by said CPU, the method comprising:

testing of circuits within said CPU by means of a test microprogram located in said control memory and executed periodically, transferring to main memory for storage therein fault information generated by the execution of said test microprogram defining the fault detected, and transferring to main memory for storage therein the contents of said data registers at the time of said fault detection.

6. The method as set forth in claim 5 including the step of reading out said fault information and information contained in said data registers at said remote terminal.

7. The method as set forth in claim 6 wherein the step of testing comprises the steps of:

measuring the time since the test microprogram was last executed, generating a request to initiate execution of said test microprogram upon the expiration of a predetermined amount of time, comparing the test microprogram request priority against other concurrent program priorities, and initiating the execution of said test microprogram when it has the highest priority.

8. In a data processing system incorporating a central processing unit CPU, main memory, an input-out processor for transferring information between a peripheral device and said main memory, and a remote terminal coupled through telephone lines and said input-out processor to said CPU, wherein said CPU contains at least one microprogrammable control memory and data registers for storage of data being operated on by said CPU, the method comprising:

testing of said control memory and the circuits within said central processing unit by means of a test microprogram located in said control memory, transferring to main memory for storage therein information defining the fault detected by said testing and the contents of said data registers at the time of said fault detection, and reading out of said fault information and said contents of said data registers at said remote terminal.

9. The method in claim 8 wherein said step of testing comprises the step of:

identifying the specific fault detected, and wherein said transferring step comprises the steps of:

forcing the data processing system into a wait state to preserve the status of all circuits, generating an interrupt which initiates a software error-logging routine, logging fault and system information in main memory by means of said software error-logging routine, and returning the data processing system to its normal function.

10. In a data processing system of the type having a main memory for storing data and program words, a central processing unit (CPU) for reading said data and program words from said main memory, for performing arithmetic and logic operations upon said words and for storing said words into said main memory, and a control memory within said CPU for storing and executing microprograms contained within said control memory to order said CPU through the steps required to perform said CPU functions, an improved diagnostic method comprising the steps of:

measuring the time since a diagnostic microprogram was last executed, generating a request to initiate execution of said diagnostic microprogram upon the expiration of a predetermined amount of time, comparing the diagnostic microprogram request priority against other concurrent program priorities, initiating the execution of said diagnostic microprogram when it has the highest priority, identifying a specific fault, forcing the CPU into a wait state to preserve the current contents of all CPU registers, generating an interrupt to initiate a software error-logging program, logging fault information and CPU register contents in main memory by means of said error-logging programs, and returning the data processing system to its original functions.

* * * * *